US009590485B2

United States Patent
Jintsugawa et al.

(10) Patent No.: US 9,590,485 B2
(45) Date of Patent: Mar. 7, 2017

(54) RESONANCE SUPPRESSION DEVICE

(71) Applicant: FUJI ELECTRIC CO., LTD., Kawasaki (JP)

(72) Inventors: Toru Jintsugawa, Hachioji (JP); Kenya Murakami, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 14/850,515

(22) Filed: Sep. 10, 2015

(65) Prior Publication Data
US 2015/0381027 A1 Dec. 31, 2015

Related U.S. Application Data

(63) Continuation of application No. PCT/JP2013/067093, filed on Jun. 21, 2013.

(51) Int. Cl.
*H02M 1/12* (2006.01)
*H02J 3/38* (2006.01)

(52) U.S. Cl.
CPC ............... *H02M 1/12* (2013.01); *H02J 3/386* (2013.01); *Y02E 10/763* (2013.01)

(58) Field of Classification Search
CPC ...... H02M 1/12; H02J 1/02; H02J 3/01; H02J 3/386

See application file for complete search history.

(56) References Cited

U.S. PATENT DOCUMENTS

| 4,685,044 A   | * | 8/1987  | Weibelzahl ............ H02M 1/12 363/35 |
|---------------|---|---------|------------------------------------------|
| 6,331,765 B1  |   | 12/2001 | Yamamoto et al.                          |
| 2013/0214536 A1 | * | 8/2013 | Wakasa .................... H02J 3/386 290/44 |
| 2014/0177294 A1 | * | 6/2014 | Lindholm ............... H02M 1/14 363/39 |

FOREIGN PATENT DOCUMENTS

| JP | 08-080052    | 3/1996 |
| JP | 11-032435    | 2/1999 |
| JP | 2000-253579  | 9/2000 |
| JP | 2002-171667  | 6/2002 |
| JP | 2003-174725  | 6/2003 |

OTHER PUBLICATIONS

International Search Report maiied Aug. 27, 2013 in corresponding international application PCT/JP2013/067093.

* cited by examiner

Primary Examiner — Matthew Nguyen

(57) ABSTRACT

A resonance suppression device, in which power loss and apparatus capacitance are reduced by outputting a compensating current only while a voltage resonance is being generated, and which suppresses resonance generated by connection of a power apparatus to a power system. In one embodiment, the device includes a capacitance change detector that detects a change of an electrostatic capacitance (impedance) connected to the power system. When the resonance detector detects the resonance, a current command value generator generates the current command value on the basis of harmonic components included in a current supplied from the power apparatus to the power system. When the impedance change detector detects a change of the impedance, the current command value generator generates the current command value so as to reduce the compensating current.

18 Claims, 20 Drawing Sheets

RESONANCE SUPPRESSION DEVICE

CROSS-REFERENCE TO RELATED APPLICATIONS

This application is a continuation application, filed under 35 U.S.C. §111(a), of International Application PCT/JP2013/067093, filed on Jun. 21, 2013, the disclosure of which is incorporated herein by reference.

BACKGROUND

1. Technical Field

The present disclosure relates to a resonance suppression device.

2. Background Art

In recent years, renewable energy has gained popularity and large-scale wind farms provided with a large number of wind power generators have been constructed.

A wind power generator includes an (AC-DC) converter that converts the generated power into a direct current power, a (DC-AC) inverter that converts the direct current power into an alternating current power, and also a harmonic filter that removes a harmonic current generated by the inverter. However, where a wind power generator provided with a harmonic filter is connected (linked) to a power system, a resonance caused by the capacitance of the harmonic filter and the inductance of the power system or a transformer is generated and the output voltage can be unstable.

Accordingly, for example, Patent Literature 1 (FIG. 2) discloses an active filter for power that extracts a harmonic component contained in a load current by using a high-pass filter (HPF) and controls a power conversion device such as to cancel the harmonic component. Further, for example, Patent Literature 2 discloses a power conversion device in which a harmonic current is suppressed by correcting a current command value with a current correction value obtained by multiplying a current flowing from an alternating current power supply to a capacitor, or a harmonic component included in a voltage generated thereby, by a predetermined transfer function.

Patent Literature 1: Japanese Patent Application Publication No. H8-80052

Patent Literature 2: Japanese Patent Application Publication No. H11-32435

Patent Literature 3: Japanese Patent Application Publication No. 2003-174725

SUMMARY

FIG. 18 illustrates an example of a state in which a resonance is generated as a result of connecting a power apparatus such as a wind power generator to a power system, and a resonance frequency component is superimposed on a connection point voltage v or an output current ie of the power apparatus (current supplied to the power system). FIG. 19 illustrates an example of a voltage frequency characteristic and a current frequency characteristic in the above state. In the voltage frequency characteristic and current frequency characteristic depicted in FIG. 19, the value of the basic wave (first-order) component is taken as 1. In this example, a comparatively large 11-th-order harmonic component (11-th-order harmonic voltage) is superimposed on the voltage, whereby a large harmonic distortion is generated in the connection point voltage v. An intermediate quantity of a harmonic component (harmonic current) is superimposed on the current.

By contrast, where the active filter for power disclosed in Patent Literature 1 (FIG. 2) is used, even when it is desirable to suppress the harmonic distortion of the connection point voltage v caused by the 11-th-order harmonic current, harmonic components of all of the orders, from among the harmonic currents included in the output current ie of the power apparatus, are suppressed. Therefore, the output current (compensating current) of the inverter having the active filter for power increases and an inverter of higher capacitance should be used.

Furthermore, with such an active filter for power, even when no harmonic distortion is generated in the connection point voltage v, where a harmonic component is superimposed on the current, the compensating current is continuously output at all times. As a result, power is lost due to constant compensation of the harmonic current, and the apparatus capacitance to be used for the active filter for power is increased.

Meanwhile, in the power conversion device disclosed in Patent Literature 2, the transfer function which is to be used for calculating the current correction value is set in advance on the basis of the impedance characteristic of the power conversion device, which is viewed from the alternating current power supply, or the capacitance of the capacitor. However, since accurate values thereof often cannot be obtained, it is difficult to set appropriately the transfer function and obtain a sufficient resonance suppression effect. Further, even when the transfer function is set appropriately, where the configuration of the power system changes, the resonance point (resonance frequency) also changes and the resonance can be regenerated.

Even when the configuration of the power system is not changed, in a wind farm provided with a plurality of wind power generators, the capacitance of the harmonic filter changes according to the number of connected wind power generators and the resonance point also changes. Thus, since the capacitances of the harmonic filters provided in the wind power generators are connected in parallel, the resonance frequency decreases with the increase in the number of connected wind power generators, for example, as depicted in FIG. 20. Therefore, in a wind farm in which the number of wind power generators connected to the power system changes, a resonance suppression method such as that of the power conversion device disclosed in Patent Literature 2 is difficult to use.

One embodiment variant of the present invention which resolves the above-described problem provides a resonance suppression device that suppresses a resonance generated by connection of a power apparatus to a power system, the resonance suppression device including: a current command value generation unit that outputs a current command value to a power conversion device connected to the power system on the basis of an input of a current supplied from the power apparatus to the power system; a resonance detection unit that detects the resonance on the basis of harmonic components included in a voltage of the power system; and an impedance change detection unit that detects a change of an impedance connected to the power system, wherein when the resonance detection unit detects the resonance, the current command value generation unit generates the current command value on the basis of harmonic components included in a current supplied from the power apparatus to the power system, and when the impedance change detection unit detects a change of the impedance, the current command value generation unit generates the current command value so as to reduce a compensating current supplied from the power conversion device to the power system.

Another embodiment variant of the present invention which resolves the above-described problem provides a resonance suppression device that suppresses a resonance generated by connection of a power apparatus to a power system, the resonance suppression device including: a current command value generation unit that generates a current command value on the basis of an input of a current supplied from the power apparatus to the power system; a resonance detection unit that detects the resonance on the basis of harmonic components included in a voltage of the power system; an impedance change detection unit that detects a change of an impedance connected to the power system; and a current control unit that controls, on the basis of the current command value, a compensating current to be supplied to the power system from a power conversion apparatus connected to the power system, wherein when the resonance detection unit detects the resonance, the current command value generation unit generates the current command value on the basis of harmonic components included in a current supplied from the power apparatus to the power system, and when the impedance change detection unit detects a change of the impedance, the current command value generation unit generates the current command value such as to reduce the compensating current.

Another embodiment variant of the present invention which resolves the above-described problem provides a resonance suppression device that suppresses a resonance generated by connection of a power apparatus to a power system, the resonance suppression device including: an inverter that supplies a compensating current in parallel with the power apparatus to the power system; a current command value generation unit that generates a current command value on the basis of an input of a current supplied from the power apparatus to the power system; a resonance detection unit that detects the resonance on the basis of harmonic components included in a voltage of the power system; an impedance change detection unit that detects a change of an impedance connected to the power system; and a current control unit that controls, on the basis of the current command value, a compensating current that is output from the inverter, wherein when the resonance detection unit detects the resonance, the current command value generation unit generates the current command value on the basis of harmonic components included in a current supplied from the power apparatus to the power system, and when the impedance change detection unit detects a change of the impedance, the current command value generation unit generates the current command value such as to reduce the compensating current.

Other features of embodiments of the present invention will become apparent from the appended drawings and the present description.

In accordance with embodiments of the present invention, the compensating current which suppresses harmonic distortions can be output only while the harmonic distortions are generated with respect to a voltage. As a result, the power loss and apparatus capacitance caused by constant compensation of harmonic current can be reduced. Further, even when a resonance point changes, the resonance can be reliably suppressed.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

At least the following features are made apparent by the present description of the invention and appended drawings.

First Embodiment

Configuration of Resonance Suppression Device

The configuration of the resonance suppression device of the first embodiment of the present invention will be described hereinbelow with reference to FIGS. 1 and 2.

Figure 1:
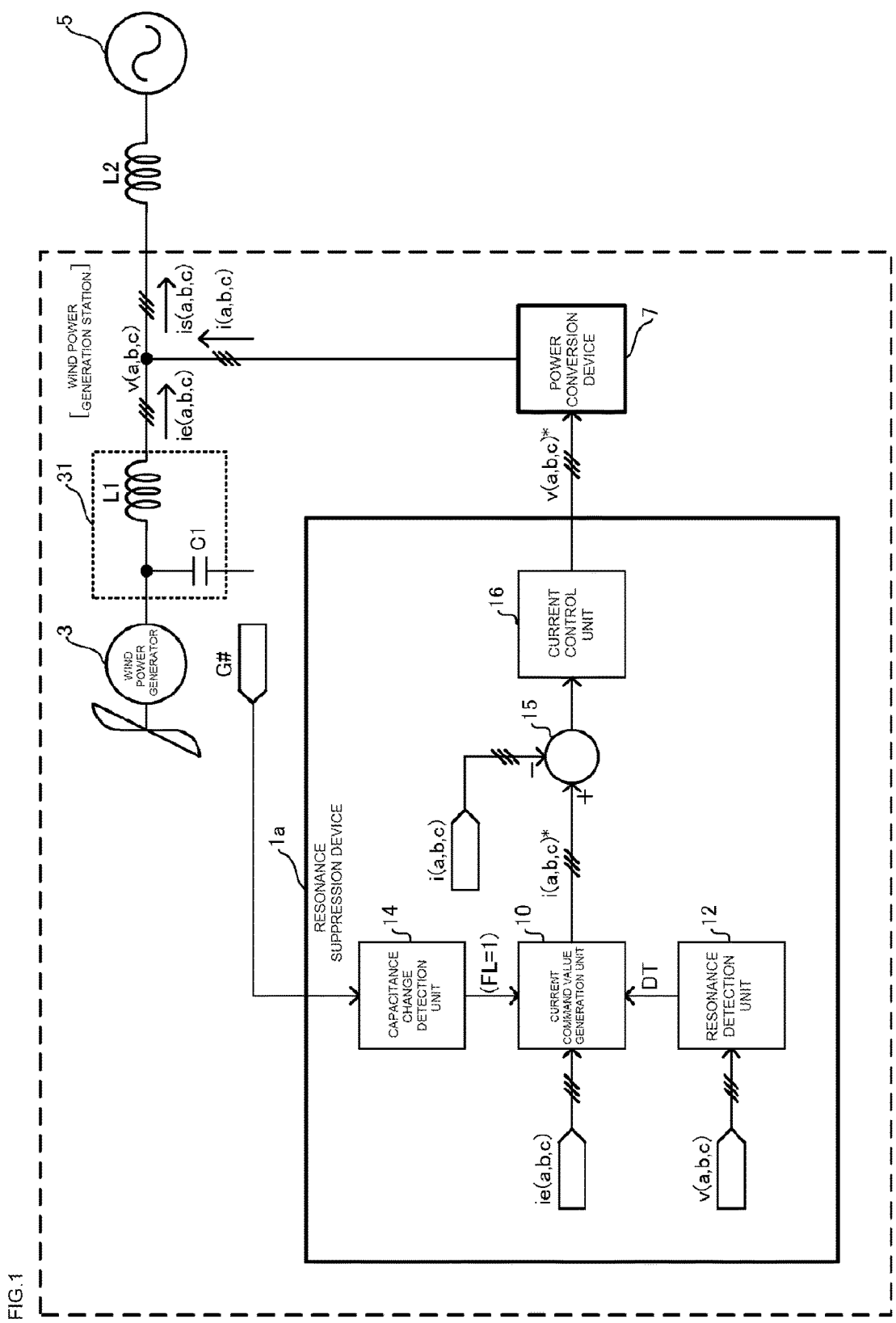
FIG. 1 is a block diagram illustrating the configuration of a resonance suppression device in the first embodiment of the present invention.

A resonance suppression device 1a depicted in FIG. 1 is disposed, for example, in a wind power generation station and serves to suppress a resonance generated by connection of a wind power generator 3 which is provided with a harmonic filter 31 to a power system 5. In the explanation below, the power system 5 is assumed to be a three-phase power system, the phases being an a-phase, a b-phase, and a c-phase. The currents or voltages of the phases are collectively represented by (a, b, c). For example, an a-phase voltage va, a b-phase voltage vb, and a c-phase voltage vc are collectively represented by v(a, b, c).

In FIG. 1, the wind power generator 3 represents one or a plurality of wind power generators connected to the power system 5. Further, in FIG. 1, the capacitances of harmonic filters provided in the one or a plurality of wind power generators connected to the power system 5 are depicted as a combined capacitance C1, and the inductances of transformers which connect the wind power generators to the power system 5 are depicted as a combined inductance L1. Further, L2 stands for the inductance of the power system 5.

In FIG. 1, ie(a, b, c) is a current supplied from the wind power generator 3 to the power system 5. Meanwhile, i(a, b, c) represents a current (compensating current) supplied from a power conversion device 7 to the power system 5. Further, is(a, b, c) represents a current supplied to the power system 5 in which the output current ie(a, b, c) of the wind power generator 3 is combined with the output current (compensating current) i(a, b, c) of the power conversion device 7. Therefore, is(a, b, c)=ie(a, b, c)+i(a, b, c). Further, v(a, b, c) represents a voltage (voltage of the power system 5) on the connection point of the wind power generator 3 and the power system 5.

The resonance suppression device 1a is constituted by a current command value generation unit 10, a resonance detection unit 12, a capacitance change detection unit 14, an addition unit 15, and a current control unit 16. The resonance suppression device 1a suppresses the resonance by controlling the compensating current i(a, b, c) supplied from the power conversion device 7 to the power system 5. In addition to the inverter, a unified power flow controller (UPFC) can be used as the power conversion device 7 capable of outputting such a compensating current i(a, b, c) (see, for example, Patent Literature 3). Further, a reactive power compensation device can be also used as the power conversion device 7.

The connection point voltage v(a, b, c) is input to the resonance detection unit 12. A detection signal DT is output from the resonance detection unit 12. The number G# of wind power generators presently connected to the power system 5 is input to the capacitance change detection unit 14.

The output current ie(a, b, c) of the wind power generator 3 and the detection signal DT are input to the current command value generation unit 10. A current command value i(a, b, c)* corresponding to the compensating current i(a, b, c) is output from the current command value generation unit 10. The current command value generation unit 10 has a detection flag FL. The detection flag FL is set to "1" by the capacitance change detection unit 14.

The addition unit 15 inputs the compensating current i(a, b, c) and the current command value i(a, b, c)* corresponding thereto. A difference (i(a, b, c)*−i(a, b, c)) between the current command value i(a, b, c)* and the compensating current i(a, b, c) is input from the addition unit 15 to the current control unit 16. A voltage command value v(a, b, c)* is output from the current control unit 16 to the power conversion device 7.

The addition unit 15 inputs the compensating current i(a, b, c) and the current command value i(a, b, c)* corresponding thereto. A difference (i(a, b, c)*−i(a, b, c)) between the current command value i(a, b, c)* and the compensating current i(a, b, c) is input from the addition unit 15 to the current control unit 16. A voltage command value v(a, b, c)* is output from the current control unit 16 to the power conversion device 7.

The dq conversion unit 110 inputs the output current ie(a, b, c) of the wind power generator 3. A d-axis component (d-axis current) ied and a q-axis component (q-axis current) ieq obtained by dq conversion thereof are output from the dq conversion unit 110. In the explanation below, the d-axis component and q-axis component are represented together by using (d, g). For example, the d-axis current ied and the q-axis current ieq are represented together as ie(d, q).

The d, q-axis current ie(d, q) is input to the high-pass filter 120. An alternating current component (AC current) ih(d, q) of the d, q-axis current ie(d, q) is output from the high-pass filter 120.

The alternating current ih(d, q) is input to the gain 130. Here, the value of the gain 130 is K(d, q), and in this case, the output value ik(d, q) of the gain 130 is:

$$ik(d, q) = K(d, q) \cdot ih(d, q).$$

The gain K(d, q) is controlled according to the value (0 or 1) of the detection flag FL of the current command value generation unit 10. The output value ik(d, q) of the gain 130 is input to the dq inverse conversion unit 140. The current command value i(a, b, c)* is output from the dq inverse conversion unit 140.

The resonance suppression device 1a can be configured as a computer system. Functions of various units of the resonance suppression device 1a can be realized by executing a program in the processor of the computer system.

Operation of Resonance Suppression Device

Figure 3:
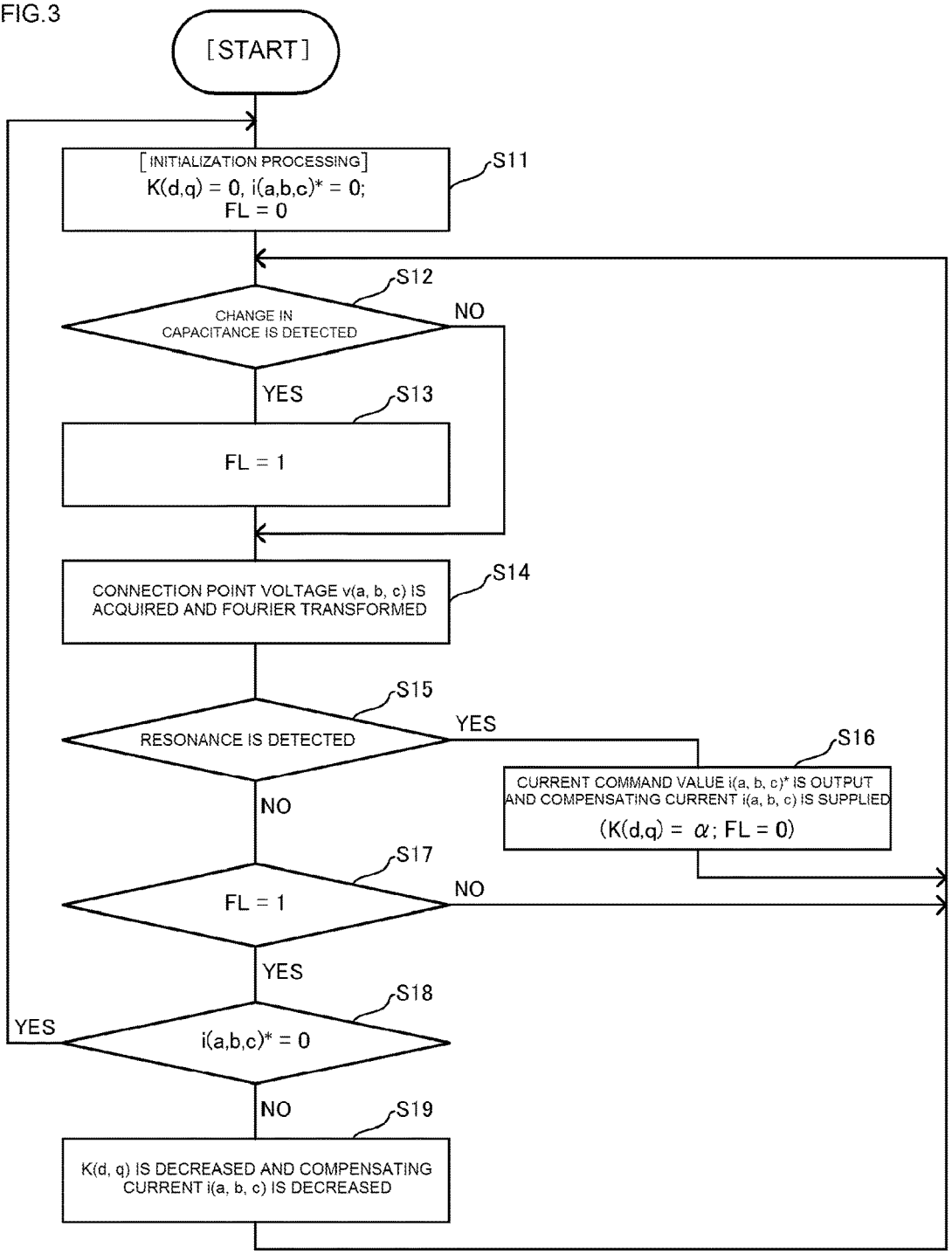
FIG. 3 is a flowchart illustrating the operation of the resonance suppression device in the first embodiment of the present invention.

The operation of the resonance suppression device of the present embodiment will be explained hereinbelow with reference to FIG. 3.

The resonance suppression device 1a initially performs the initialization processing of the current command value generation unit 10. In the initialization processing, the gain K(d, q) depicted in FIG. 2 is set to 0, and the current command value i(a, b, c)* is set to 0. As a result, the supply of the compensating current i(a, b, c) from the power conversion device 7 depicted in FIG. 1 to the power system 5 is stopped. The detection flag FL of the current command value generation unit 10 is set to 0 (S11).

The capacitance change detection unit 14 depicted in FIG. 1 detects the change of the capacitance connected to the power system 5 and determines the presence/absence of the detection (S12). In the present embodiment, the capacitance change detection unit 14 acquires online the number G# of the wind power generators presently connected to the power system 5 and detects the change of the combined capacitance C1 of the harmonic filters provided in the wind power generators presently connected to the power system (G#). Thus, the capacitance change detection unit 14 detects the change of the combined capacitance C1 occurring when the number G# of the connected wind power generators changes (S12: YES), and the detection flag FL of the current command value generation unit 10 is set to 1 (S13). Meanwhile, where the capacitance change detection unit 14 does not detect the change of capacitance (S12: NO), the processing of S13 is not performed.

The resonance detection unit 12 depicted in FIG. 1 acquires the connection point voltage v(a, b, c) and performs the Fourier transform thereof (S14). For example, a fast Fourier transform (FFT) algorithm is used the Fourier transform. The resonance detection unit 12 detects a resonance corresponding to the connection point voltage v(a, b, c) (referred to hereinbelow as voltage resonance) from a peak of the obtained frequency spectrum, and determines the presence/absence of the detection (S15). For example, each harmonic component (harmonic voltage) of the connection point voltage v(a, b, c) is compared with a preset threshold, and where the threshold is exceeded at any of the frequencies, a detection signal DT indicating the detection of resonance is output. The threshold may be set for each frequency or commonly for all of the frequencies.

When the resonance detection unit 12 detects a voltage resonance (S15: YES), the current command value generation unit 10 takes the gain K(d, q), which is depicted in FIG. 2, as a (0<α≤1) and outputs the current command value i(a, b, c)*. As a result, the compensating current i(a, b, c) is supplied from the power conversion device 7 depicted in FIG. 1 to the power system 5. The detection flag FL is set to 0 (S16), and the processing returns to S12.

When the resonance detection unit 12 detects a voltage resonance (S15: YES), the current command value generation unit 10 takes the gain K(d, q), which is depicted in FIG. 2, as α (0<α≤1) and outputs the current command value i(a, b, c)*. As a result, the compensating current i(a, b, c) is supplied from the power conversion device 7 depicted in FIG. 1 to the power system 5. The detection flag FL is set to 0 (S16), and the processing returns to S12.

The high-pass filter 120 extracts the alternating current component included in the d, q-axis current ie(d, q). This corresponds to the extraction of the harmonic component included in the output current ie(a, b, c). Further, the dq inverse conversion unit 140 performs, by using the system frequency f0, the dq inverse conversion of ik(d, q) obtained by multiplying the output value (AC current) ih (d, q) of the high-pass filter 120 by the gain K(d, q)=α. As a result, the current command value i(a, b, c)* necessary for canceling the harmonic component of the output current ie(a, b, c) is generated.

Then, the current control unit 16 depicted in FIG. 1 generates a voltage command value v(a, b, c)* corresponding to the difference (i(a, b, c)*−i(a, b, c)) between the current command value i(a, b, c)* and the compensating current i(a, b, c), and outputs the generated voltage command value to the power conversion device 7. As a result, the power conversion device 7 supplies to the power system 5 the compensating current i(a, b, c) which follows the current command value i(a, b, c)*.

Meanwhile, where the resonance detection unit 12 does not detect the voltage resonance (S15: NO), the processing of S16 is not performed, and the processing advances to S17. Then, the resonance suppression device 1a repeats the processing from S12 to S17 until the capacitance change detection unit 14 detects the change of the combined capacitance C1, that is, while the detection flag is FL=0 (S17: NO).

When the capacitance change detection unit 14 detects the change of the combined capacitance C1 and the detection flag becomes FL=1 (S17: YES), the processing advances to S18. The current command value generation unit 10 then decreases the gain K(d, q) depicted in FIG. 2 and decreases the current command value i(a, b, c)* until the current command value i(a, b, c)* becomes 0 (S18: NO). As a result, the compensating current i(a, b, c) supplied from the power conversion device 7 depicted in FIG. 1 to the power system 5 is decreased (S19). The gain K(d, q) may be decreased gradually at a constant rate or reduced to 0 at once.

Where a state is assumed in which the voltage resonance is not generated, even though the compensating current i(a, b, c) is stopped, because the number G# of the connected wind power generators has changed, the resonance suppression device 1a repeats the processing in the order of S12: NO, S14, S15: NO, S17: YES, S18: NO, S19. Where the current command value i(a, b, c)* then becomes equal to 0 (S18: YES), the processing results to S11 and the processing is then started again from the initialization of the current command value generation unit 10.

Where the voltage resonance is generated at the above-mentioned or different resonance frequency due to the decrease in the compensating current i(a, b, c), and this voltage resonance is detected by the resonance detection unit 12 (S15: YES), the processing of S16 is performed. The current command value generation unit 10 again takes the gain K(d, q), which is depicted in FIG. 2, as a and outputs the current command value i(a, b, c)*. As a result, the compensating current i(a, b, c) is supplied from the power conversion device 7 depicted in FIG. 1 to the power system 5. Since the detection flag becomes FL=0, the resonance suppression device 1a repeats the processing from S12 to S17 until the detection flag again becomes FL=1 (S17: NO).

Thus, the resonance suppression device 1a of the present embodiment starts the supply of the compensating current i(a, b, c) from the power conversion device 7 to the power system 5 when the resonance detection unit 12 detects a voltage resonance. Where the capacitance change detection unit 14 detects the change of the combined capacitance C1, the compensating current i(a, b, c) is decreased, and after it has been checked whether or not the voltage resonance is generated, the supply of the compensating current i(a, b, c) is stopped or continued. As a result, the compensating current i(a, b, c) that suppresses the voltage resonance can be output only when the voltage resonance is generated, and the power loss or device capacitance caused by constant compensation of harmonic current can be eliminated.

Figure 4:
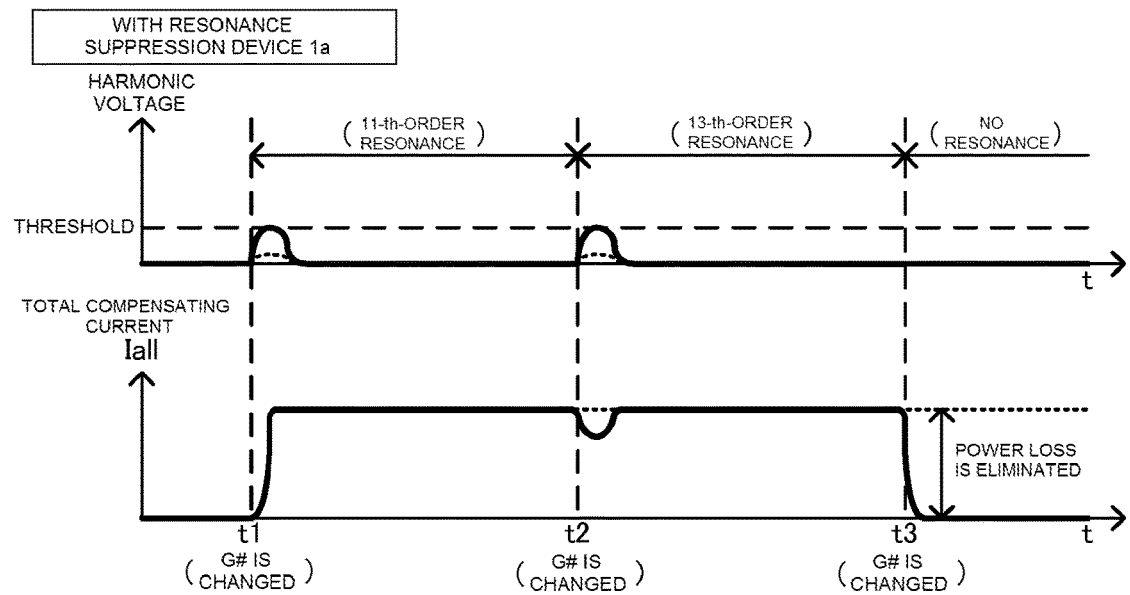
FIG. 4 is a schematic diagram illustrating an example of voltage resonance suppression operation performed by the resonance suppression device in the first embodiment of the present invention.

An example of the voltage resonance suppression operation performed by the resonance suppression device 1a is depicted in FIG. 4.

FIG. 4 illustrates the case in which the number G# of the connected wind power generators is changed at timings t1, t2, and t3. Due to such changes in the number G# of the connected wind power generators, a voltage resonance caused by the 11-th-order harmonic voltage (referred to hereinbelow as 11-th-order resonance) is generated within a period from the timing t1 to the timing t2, and a 13-th-order resonance is generated within a period from the timing t2 to the timing t3. No voltage resonance is generated at and after the timing t3.

In this case, the harmonic voltage and a total compensating current Iall (sum total of the frequency components of the compensating current i(a, b, c)) obtained when the resonance suppression device 1a is used are represented by solid lines. For comparison, the harmonic voltage and a total compensating current Iall obtained by using the active filter for power which is depicted in FIG. 2 of Patent Literature 1 are represented by short broken lines.

As indicated by the solid lines in FIG. 4, when the resonance suppression device 1a is used, the resonance detection unit 12 detects the 11-th-order resonance, the supply of the compensating current i(a, b, c) is started at the timing t1, and the 11-th order resonance is suppressed. Where the number G# of the connected wind power generators is changed at the timing t2, the capacitance change detection unit 14 detects the change of the combined capacitance C1, and the compensating current i(a, b, c) is decreased. Therefore, the 13-th-order resonance is generated at once. However, since the resonance detection unit 12 detects the 13-th-order resonance and the supply of the compensating current i(a, b, c) is continued, the 13-th-order resonance is thereafter suppressed. Further, where the number G# of the connected wind power generators is changed at the timing t3 and the harmonic voltage exceeding the threshold is not anymore present, the capacitance change detection unit 14 detects the change of the combined capacitance C1, and the compensating current i(a, b, c) decreases and eventually becomes 0.

Figure 2:
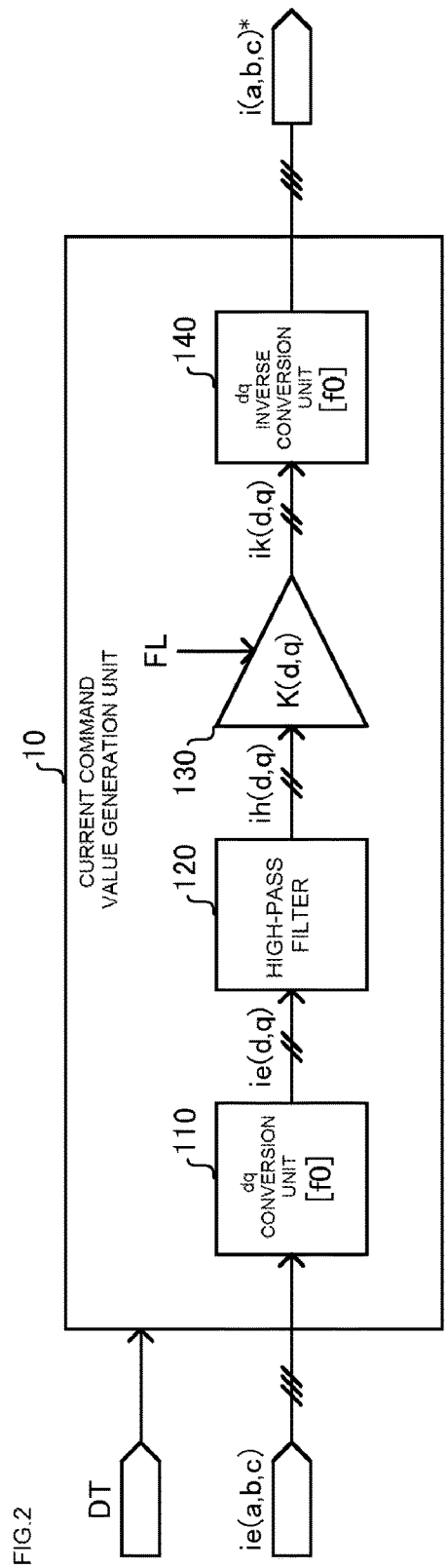
FIG. 2 is a block diagram illustrating a current command value generation unit in the first embodiment of the present invention.

The supply of the compensating current i(a, b, c) is started and the 11-th-order resonance is suppressed at the timing t1 also when the active filter for power depicted in FIG. 2 of Patent Literature 1 is used, as represented by the short broken line in FIG. 4. Further, even when the number G# of the connected wind power generators changes at the timing t2, the compensating current i(a, b, c) is continuously supplied without reduction, and therefore the 13-th-order resonance is also suppressed. Although the number G# of the connected wind power generators is then changed at the timing t3 and no voltage resonance is generated, the compensating current i(a, b, c) is continuously supplied without reduction.

As described hereinabove, when the resonance suppression device 1a is used, the compensating current i(a, b, c) becomes 0 at and after the timing t3, whereas when the active filter for power depicted in FIG. 2 of Patent Literature 1 is used, the supply of the compensating current i(a, b, c) is continued even at and after the timing t3. Therefore, by using the resonance suppression device 1a, it is possible to stop the supply of the compensating current i(a, b, c) at and after the timing t3 and reduce the power loss correspondingly.

Figure 5:
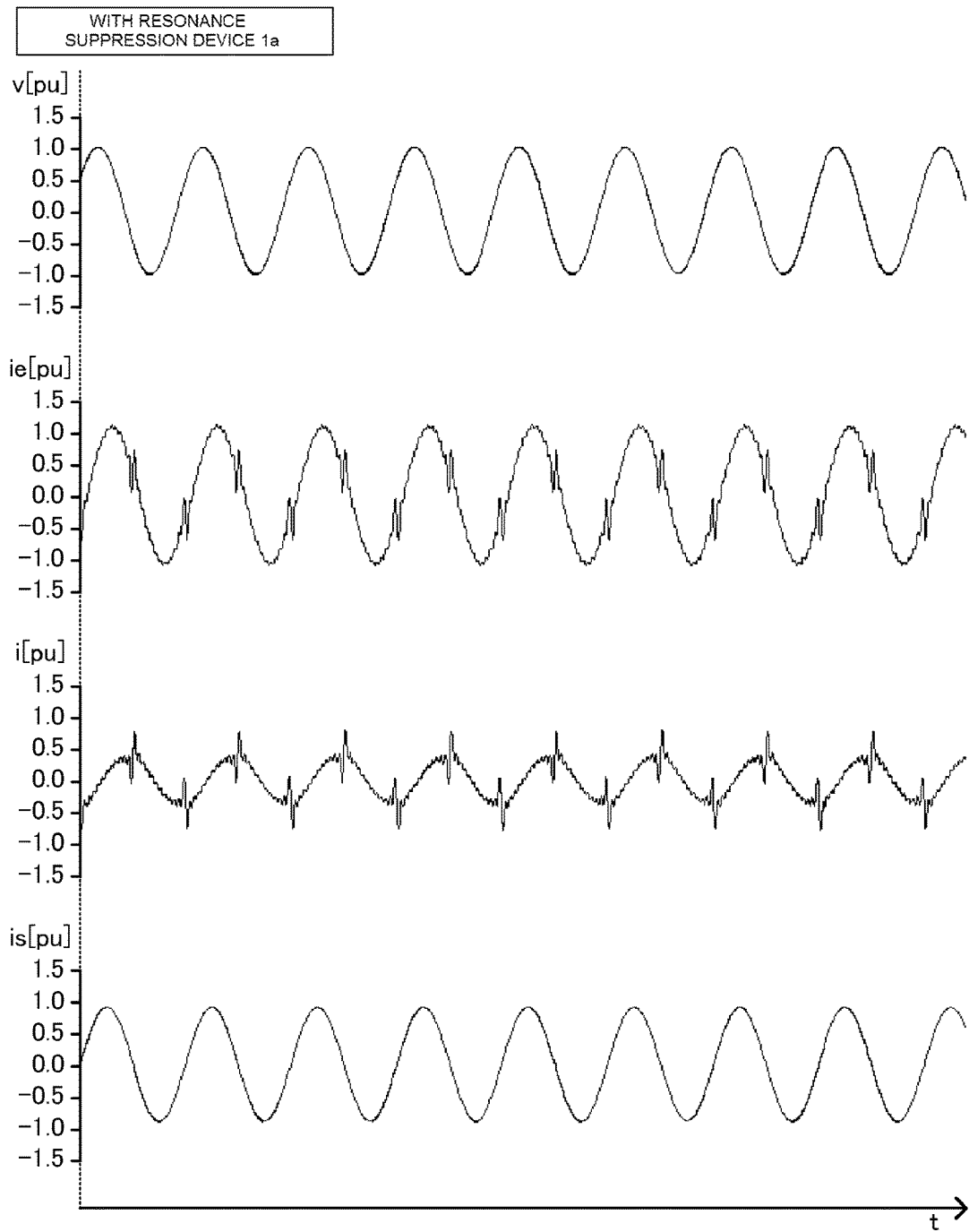
FIG. 5 is a schematic diagram illustrating an example of voltage v and currents ie, i, and is obtained by suppressing the voltage resonance with the resonance suppression device in the first embodiment of the present invention.
Figure 6:
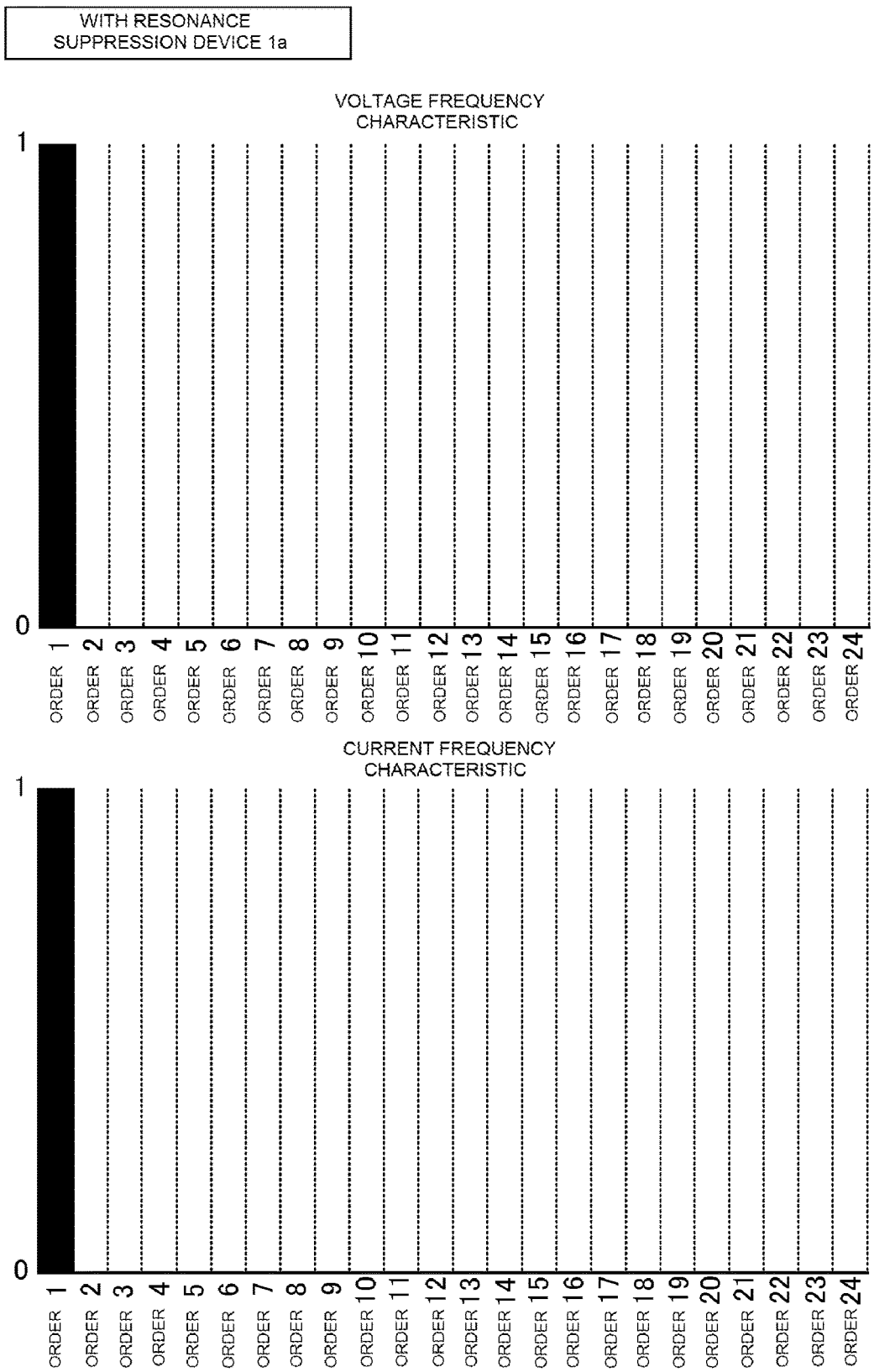
FIG. 6 is a schematic diagram illustrating an example of voltage frequency characteristic and current frequency characteristic obtained by suppressing the voltage resonance with the resonance suppression device in the first embodiment of the present invention.

Further, the resonance suppression device 1a extracts the alternating current component of the d, q-axis current ie(d, q) corresponding to the harmonic component of the output current ie(a, b, c) with the high-pass filter 120 and generates the current command value i(a, b, c)* on the basis thereof. Then, as a result of supplying the compensating current i(a, b, c) following the current command value i(a, b, c)* to the power system 5, all of the harmonic components are suppressed, for example, as depicted in FIGS. 5 and 6, and the waveform of the connection point voltage v(a, b, c) becomes a substantially perfect sinusoidal wave. Therefore, the resonance can be reliably suppressed even when the resonance point changes.

Second Embodiment

Configuration of Resonance Suppression Device

The configuration of the resonance suppression device according to the second embodiment of the present disclosure will be described hereinbelow with reference to FIGS. 7 and 8.

Figure 7:
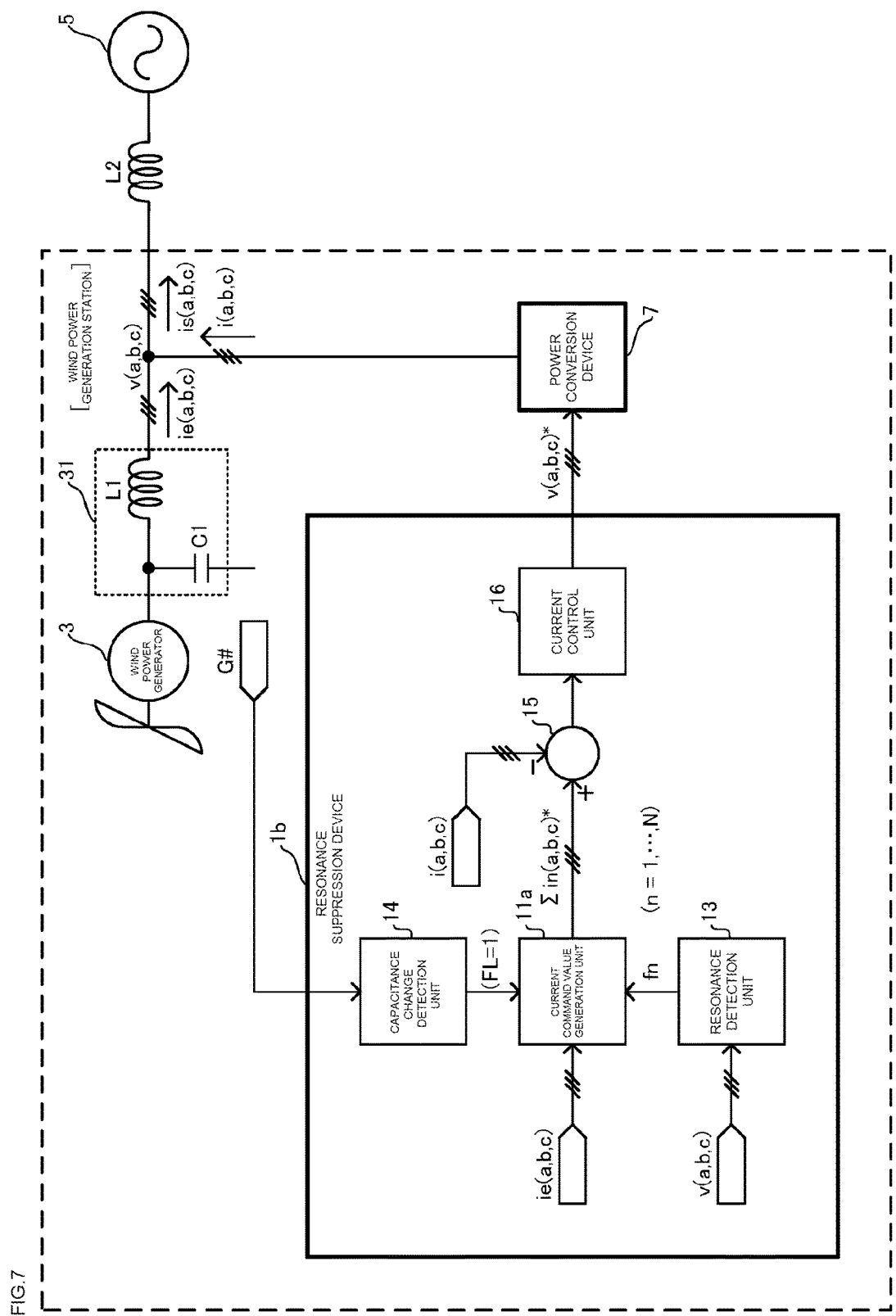
FIG. 7 is a block diagram illustrating the configuration of a resonance suppression device in the second embodiment of the present invention.

A resonance suppression device 1b depicted in FIG. 7 is configured by a current command value generation unit 11a and a resonance detection unit 13 instead of the current command value generation unit 10 and the resonance detection unit 12 of the resonance suppression device 1a of the first embodiment.

The connection point voltage v(a, b, c) is input to the resonance detection unit 13. The detected maximum N resonance frequencies fn (n=1, ..., N) are output from the resonance detection unit 13.

The output current ie(a, b, c) of the wind power generator 3 and the resonance frequencies fn are input to the current command value generation unit 11a. The sum total Σin(a, b, c)* of the current command values corresponding to the compensating current i(a, b, c) is output from the current command value generation unit 11a correspondingly to the resonance frequency fn. The current command value generation unit 11a has a detection flag FL. The detection flag FL is set to "1" by the capacitance change detection unit 14.

Figure 8:
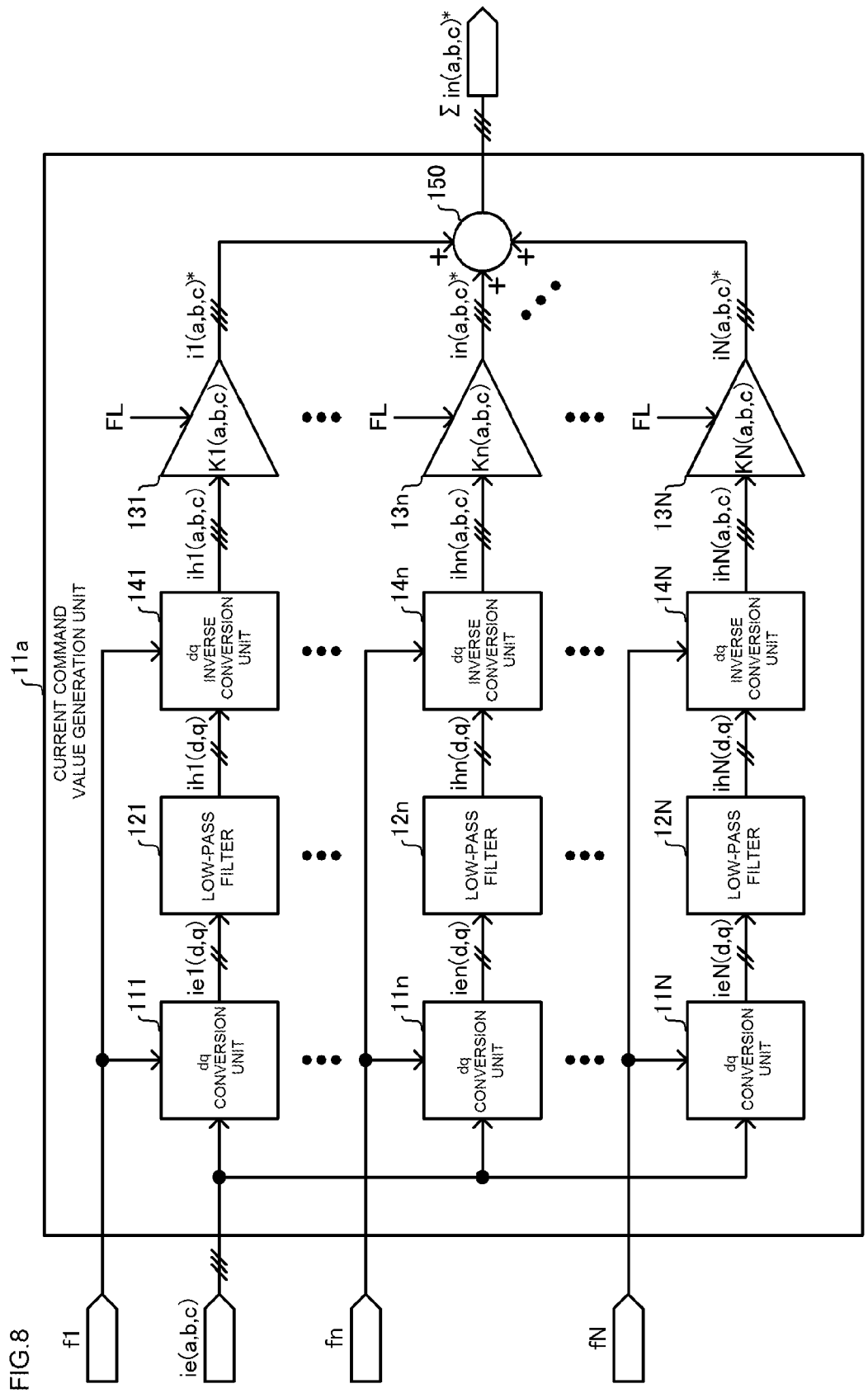
FIG. 8 is a block diagram illustrating a current command value generation unit in the second embodiment of the present invention.

FIG. 8 depicts the configuration of the current command value generation unit 11a in the present embodiment. The current command value generation unit 11a depicted in FIG. 8 is configured by N of each of dq conversion units 11n, low-pass filters 12n, gains 13n, and dq inverse conversion units 14n, and one addition unit 150.

The output current ie(a, b, c) of the wind power generator 3 and the resonance frequencies fn are input to the dq conversion unit 11n. Here, d-axis components (d-axis currents) iend and q-axis components (q-axis currents) ienq obtained by the dq conversion of the input are output from the dq conversion unit 11n.

The d, q-axis currents ien(d, q) are input to the low-pass filters 12n. Direct current components (DC currents) ihn(d, q) of the d, q-axis currents ien(d, q) are output from the low-pass filters 12n.

The direct currents ihn(d, q) and the resonance frequencies fn are input to the dq inverse conversion units 14n. Further, output values ihn(a, b, c) obtained by the dq inverse conversion of the direct currents ihn(d, q) are input from the dq inverse conversion units 14n to the gains 13n. Current command values in(a, b, c)* are output from the gains 13n. Here, the values of the gains 13n are taken as Kn(a, b, c), and in this case the current command values in(a, b, c)* become in(a, b, c)*=Kn(a, b, c)·ihn(a, b, c). The gains Kn(a, b, c) are controlled in response to the value (0 or 1) of the detection flag FL of the current command value generation unit 11a.

The current command values in(a, b, c)* output from the gains 13n are input to the addition unit 150. The sum total ρin(a, b, c)* of the current command values is output from the addition unit 150.

The resonance suppression device 1b can be configured as a computer system. Functions of various units of the resonance suppression device 1b can be realized by executing a program in the processor of the computer system.

Operation of Resonance Suppression Device

Figure 9:
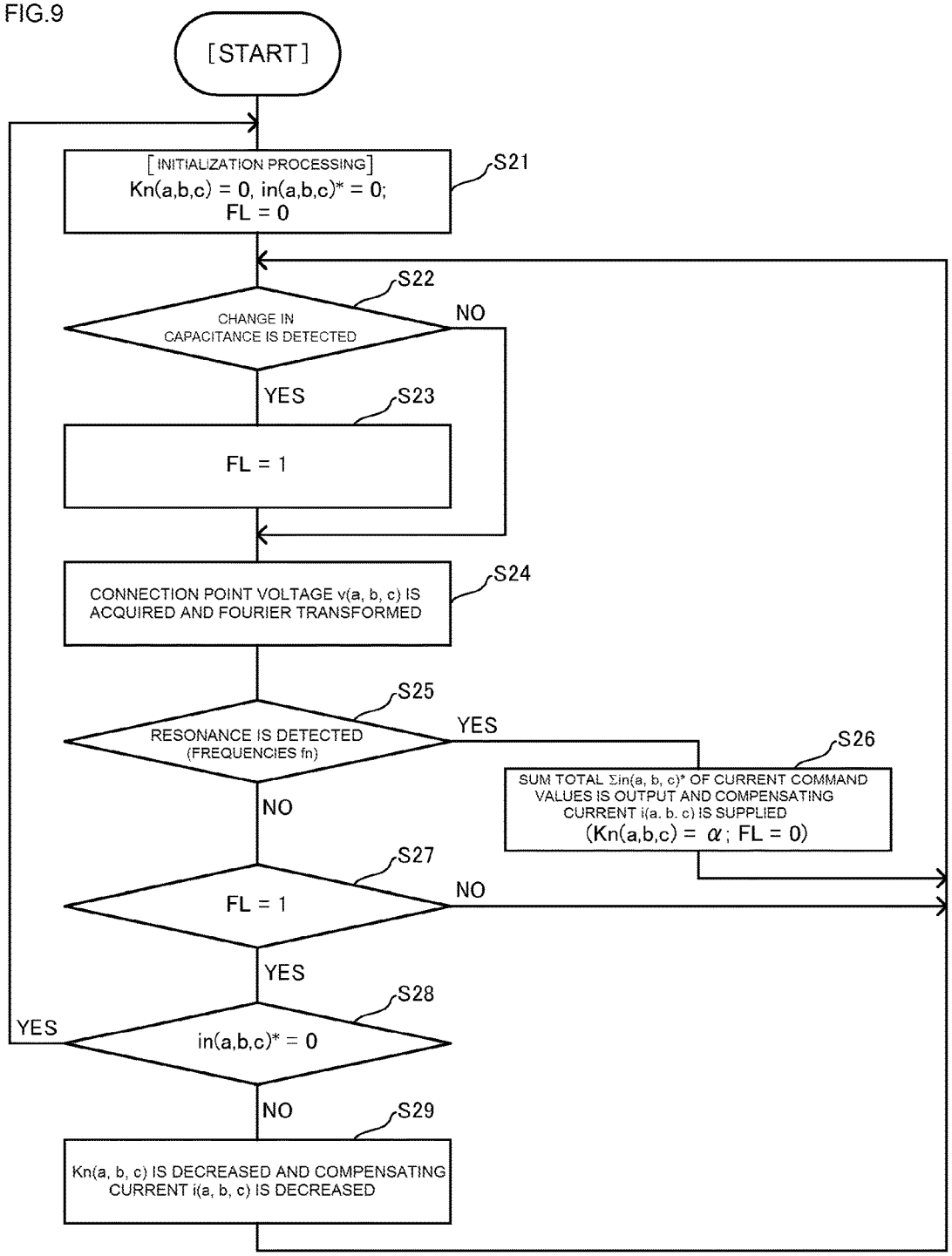
FIG. 9 is a flowchart illustrating the operation of the resonance suppression device in the second embodiment of the present invention.

The operation of the resonance suppression device of the present embodiment will be explained hereinbelow with reference to FIG. 9.

In this case, as depicted in FIG. 8, the current command value generation unit 11a is provided with N sets of the dq conversion units 11n, low-pass filters 12n, gains 13n, and dq inversion units 14n corresponding to the resonance frequencies fn. Therefore, the resonance detection unit 13 determines the resonance frequencies fn up to a maximum of N frequencies correspondingly to the sets, that is, from the resonance frequency f1 to a maximum of fN. Further, in FIG. 9, the processing is presented for "n" items from "1" to "N", such as the resonance frequencies fn from f1 to fN and gains Kn(a, b, c) from K1(a, b, c) to KN(a, b, c).

The resonance suppression device 1b initially performs the initialization processing of the current command value generation unit 11a. In the initialization processing, the gains Kn(a, b, c) depicted in FIG. 8 are set to 0, and the current command values in(a, b, c)* are set to 0. As a result, the supply of the compensating current i(a, b, c) from the power conversion device 7 depicted in FIG. 7 to the power system 5 is stopped. The detection flag FL of the current command value generation unit 11a is set to 0 (S21).

The capacitance change detection unit 14 depicted in FIG. 7 detects the change of the capacitance connected to the power system 5 and determines the presence/absence of the detection (S22). In the same manner as in the first embodiment, the capacitance change detection unit 14 acquires online the number G# of the wind power generators presently connected to the power system 5, detects the change of the combined capacitance C1 when the number G# changes (S22: YES), and sets the detection flag FL of the current command value generation unit 11a to 1 (S23). Meanwhile, where the capacitance change detection unit 14 does not detect the change of capacitance (S22: NO), the processing of S23 is not performed.

The resonance detection unit 13 depicted in FIG. 7 acquires the connection point voltage v(a, b, c) and performs the Fourier transform thereof, for example, by a FFT algorithm (S24). Then, the resonance detection unit 13 detects a voltage resonance from a peak of the obtained frequency spectrum, determines the presence/absence of the detection, and determines the resonance frequencies fn of the detected voltage resonance (S25). For example, each harmonic component (harmonic voltage) of the connection point voltage v(a, b, c) is compared with a preset threshold, and where the threshold is exceeded at one or more frequencies, those frequencies are output as the resonance frequencies fn. The threshold may be set for each frequency or commonly for all of the frequencies.

In this case, as mentioned hereinabove, the resonance detection unit 13 determines the resonance frequencies fn to a maximum of N correspondingly to the sets. For example, where the threshold is exceeded at M (>N) frequencies, N frequencies are selected from the M frequencies in the order of the size of each component or the excess ratio of each component with respect to the threshold.

When the resonance detection unit 13 detects a voltage resonance at one or more the resonance frequencies fn (S25: YES), the current command value generation unit 11a takes the gains Kn(a, b, c), which are depicted in FIG. 8, as α, generates current command values in(a, b, c)*, and outputs the sum total Σin(a, b, c) thereof. As a result, the compensating current i(a, b, c) is supplied from the power conversion device 7 depicted in FIG. 7 to the power system 5. The detection flag FL is set to 0 (S26), and the processing returns to S22.

More specifically, initially, the dq conversion units 11n depicted in FIG. 8 perform the dq conversion of the output current ie(a, b, c) of the wind power generator 3 by using the resonance frequencies fn input from the resonance detection unit 13. As a result, the d-axis components (d-axis currents) iend and q-axis components (q-axis currents) ienq in the rotary coordinate system which rotates at angular frequencies on corresponding to the resonance frequencies fn are output. In this case, the resonance frequency fn components of the output current ie(a, b, c) are included as direct current components in the d, q-axis currents ien(d, q), and other frequency components are included as alternating current component in the d, q-axis current ien(d, q).

The low-pass filters 12n extract the direct current components included in the d, q-axis currents ien(d, q). This corresponds to the extraction of the resonance frequency fn components included in the output current ie(a, b, c). Further, the dq inverse conversion units 14n multiply the output values ihn(a, b, c), which are obtained by the dq inverse conversion of the output values (DC current) ihn(d, q) of the low-pass filters 12n, by the gains Kn(d, q)=α. As a result, the current command values in(a, b, c)* necessary for canceling the harmonic component of the output current ie(a, b, c) are generated.

Then, the current control unit 16 depicted in FIG. 7 generates a voltage command value v(a, b, c)* corresponding to the difference (Σin(a, b, c)*−i(a, b, c)) between the sum total of current command values Σin(a, b, c)* and the compensating current i(a, b, c), and outputs the generated voltage command value to the power conversion device 7. As a result, the power conversion device 7 supplies to the power system 5 the compensating current i(a, b, c) which follows the sum total of current command values Σin(a, b, c)*.

Meanwhile, where the resonance detection unit 13 does not detect the voltage resonance (S25: NO), the processing of S26 is not performed, and the processing advances to S27. Then, the resonance suppression device 1b repeats the processing from S22 to S27 until the capacitance change detection unit 14 detects the change of the combined capacitance C1, that is, while the detection flag is FL=0 (S27: NO). Further, in S25, the resonance detection unit 13 can detect a voltage resonance at a new resonance frequency within a range in which the total number of N is not exceeded.

When the capacitance change detection unit 14 detects the change of the combined capacitance C1 and the detection flag becomes FL=1 (S27: YES), the processing advances to S28. The current command value generation unit 11a then decreases the gains Kn(a, b, c) depicted in FIG. 8 and decreases the current command values in(a, b, c)* until the current command values in(a, b, c)* become 0 for all n (S28: NO). As a result, the compensating current i(a, b, c) supplied from the power conversion device 7 depicted in FIG. 7 to the power system 5 is decreased (S29). The gains Kn(a, b, c) may be decreased gradually at a constant rate or reduced to 0 at once.

Where a state is assumed in which the voltage resonance is not generated, even though the compensating current i(a, b, c) is stopped, because the number G# of the connected wind power generators has changed, the resonance suppression device 1b repeats the processing in the order of S22: NO, S24, S25: NO, S27: YES, S28: NO, S29. Where the current command values in(a, b, c)* then become equal to 0 for all n (S28: YES), the processing returns to S21 and the processing is then started again from the initialization of the current command value generation unit 11a.

Where the voltage resonance is generated at the above-mentioned or different resonance frequency due to the decrease in the compensating current i(a, b, c), and this voltage resonance is detected by the resonance detection unit 13 (S25: YES), the processing of S26 is performed. The current command value generation unit 11a then again takes the gains Kn(a, b, c), which are depicted in FIG. 8, as α and outputs the sum total of current command values Σin(a, b, c)*. As a result, the compensating current i(a, b, c) is supplied from the power conversion device 7 depicted in FIG. 7 to the power system 5. Since the detection flag becomes FL=0, the resonance suppression device 1b repeats the processing from S22 to S27 until the detection flag again becomes FL=1 (S27: NO).

Thus, the resonance suppression device 1b of the present embodiment starts the supply of the compensating current i(a, b, c) from the power conversion device 7 to the power system 5 when the resonance detection unit 13 detects a voltage resonance. Where the capacitance change detection unit 14 detects the change of the combined capacitance C1, the compensating current i(a, b, c) is decreased, and after it has been checked whether or not the voltage resonance is generated, the supply of the compensating current i(a, b, c) is stopped or continued. As a result, the compensating current i(a, b, c) that suppresses the voltage resonance can be output only when the voltage resonance is generated, in the same manner as in the resonance suppression device 1a of the first embodiment, and the power loss or device capacitance caused by constant compensation of harmonic current can be eliminated.

Figure 10:
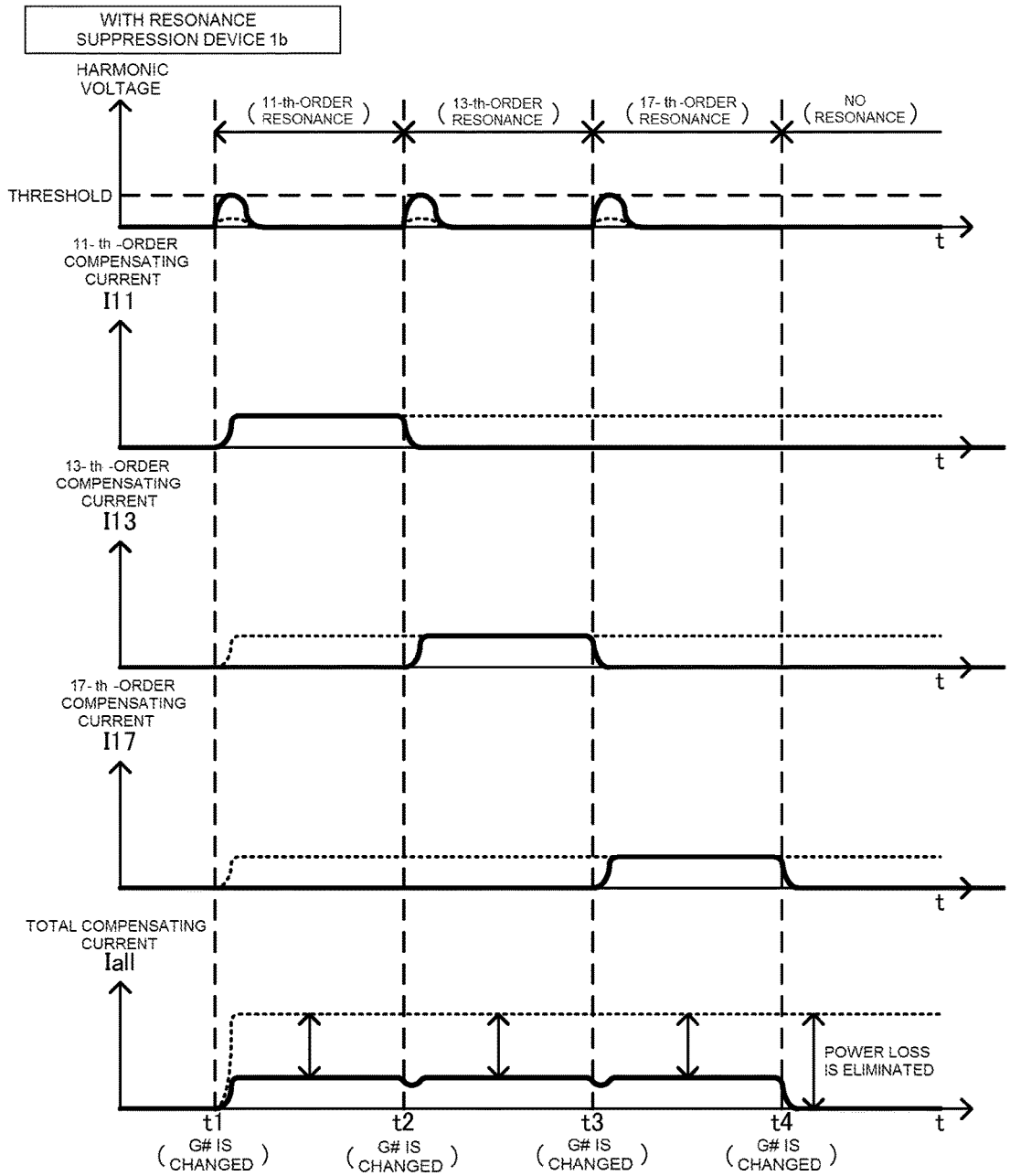
FIG. 10 is a schematic diagram illustrating an example of voltage resonance suppression operation performed by the resonance suppression device in the second embodiment of the present invention.

An example of the voltage resonance suppression operation performed by the resonance suppression device 1b is depicted in FIG. 10.

FIG. 10 illustrates the case in which the number G# of the connected wind power generators is changed at timings t1, t2, t3, and t4. Due to such changes in the number G# of the connected wind power generators, the 11-th-order resonance is generated within a period from the timing t1 to the timing t2, the 13-th-order resonance is generated within a period from the timing t2 to the timing t3, and the 17-th-order resonance is generated within a period from the timing t3 to the timing t4. No voltage resonance is generated at and after the timing t4.

In this case, the harmonic voltage, components corresponding to the 11-th-order, 13-th-order, and 17-th-order harmonics (referred to hereinbelow as an 11-th-order compensating current I11, a 13-th-order compensating current I13, and a 17-th-order compensating current I17) from among the components of the compensating current i(a, b, c), and a total compensating current Iall, which are obtained when the resonance suppression device 1b is used, are represented by solid lines. For comparison, the harmonic voltage, 11-th-order compensating current I11, 13-th-order compensating current I13, 17-th-order compensating current I17, and total compensating current Iall obtained by using the active filter for power which is depicted in FIG. 2 of Patent Literature 1 are represented by short broken lines.

As indicated by the solid lines in FIG. 10, when the resonance suppression device 1 b is used, the resonance detection unit 13 detects the 11-th-order resonance at the timing t1, the supply of the 11-th-order compensating current I11 is started, and the 11-th order resonance is suppressed. Where the number G# of the connected wind power generators is changed at the timing t2, the capacitance change detection unit 14 detects the change of the combined capacitance C1, and the 11-th-order compensating current I11 is decreased. In this case, although the 13-th-order resonance is generated at once, since the resonance detection unit 13 detects the 13-th-order resonance and the supply of the 13-th-order compensating current I13 is started, the 13-th-order resonance is thereafter suppressed. Likewise, at the timing t3, the 13-th-order compensating current I13 is decreased, the supply of the 17-th-order compensating current I17 is started, and the generated 17-th-order resonance is suppressed. Further, where the number G# of the connected wind power generators is changed at the timing t4 and the harmonic voltage exceeding the threshold is not anymore present at any frequency, the capacitance change detection unit 14 detects the change of the combined capacitance C1, and the total compensating current Iall decreases and eventually becomes 0.

The supply of the 11-th-order compensating current I11 is started and the 11-th-order resonance is suppressed at the timing t1 also when the active filter for power depicted in FIG. 2 of Patent Literature 1 is used, as represented by the short broken line in FIG. 10. Further, the supply of the 13-th-order compensating current I13 and the 17-th-order compensating current I17 is also started at this time. Furthermore, even when the number G# of the connected wind power generators changes at the timing t2 or t3, the 11-th-order compensating current I11, 13-th-order compensating current I13, and the 17-th-order compensating current I17 are continuously supplied without reduction, and therefore the 13-th-order resonance and 17-th-order resonance are also suppressed. Although the number G# of the connected wind power generators is then changed at the timing t4 and no voltage resonance is generated, the total compensating current Iall is continuously supplied without reduction.

As described hereinabove, when the resonance suppression device 1b is used, the total compensating current Iall becomes 0 at and after the timing t4, whereas when the active filter for power depicted in FIG. 2 of Patent Literature 1 is used, the supply of the total compensating current Iall is continued even at and after the timing t4. Therefore, by using the resonance suppression device 1b, it is possible to stop the supply of the total compensating current Iall at and after the timing t4 and reduce the power loss correspondingly.

Figure 11:
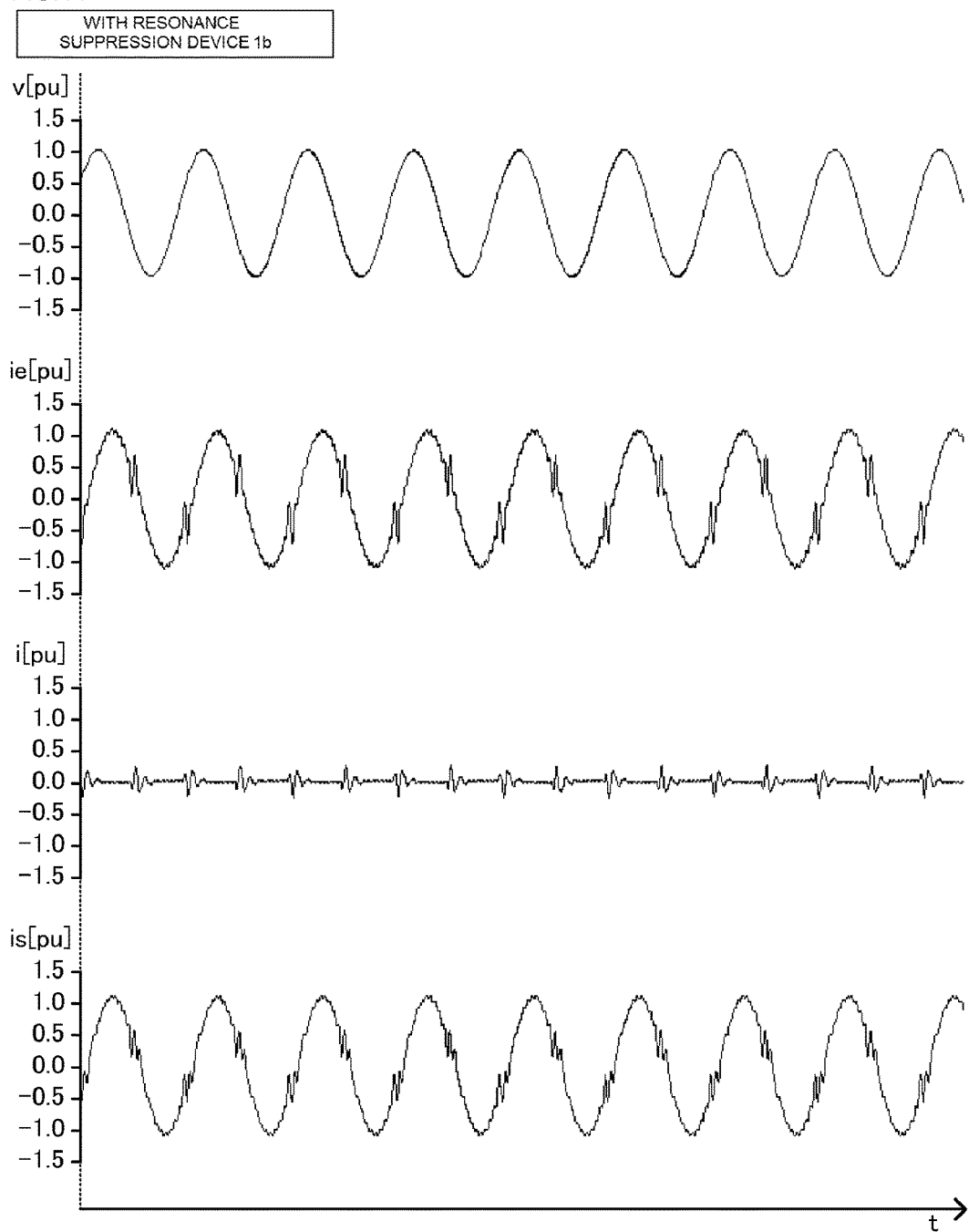
FIG. 11 is a schematic diagram illustrating an example of voltage v and currents ie, i, and is obtained by suppressing the voltage resonance with the resonance suppression device in the second embodiment of the present invention.
Figure 12:
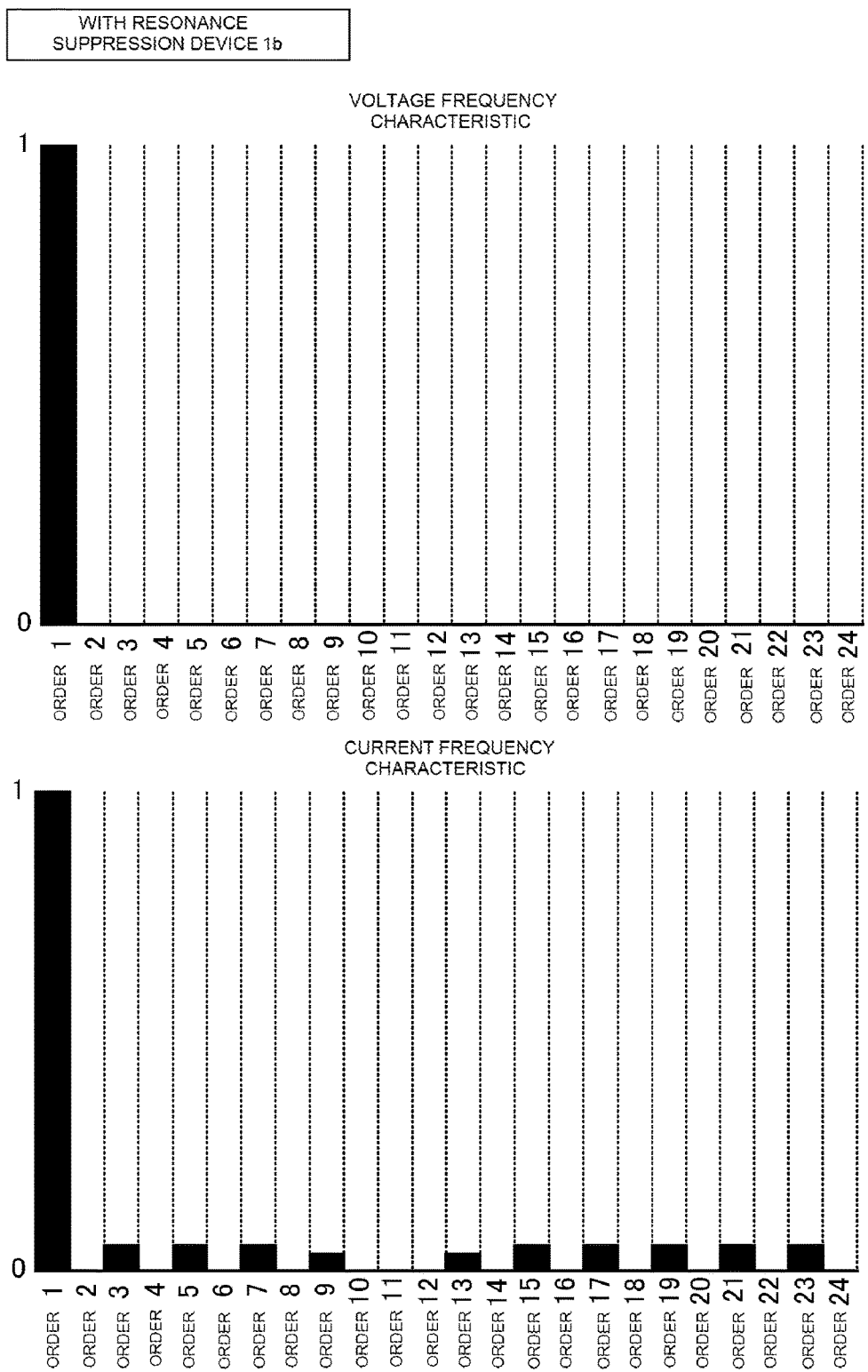
FIG. 12 is a schematic diagram illustrating an example of voltage frequency characteristic and current frequency characteristic obtained by suppressing the voltage resonance with the resonance suppression device in the second embodiment of the present invention.
Figure 19:
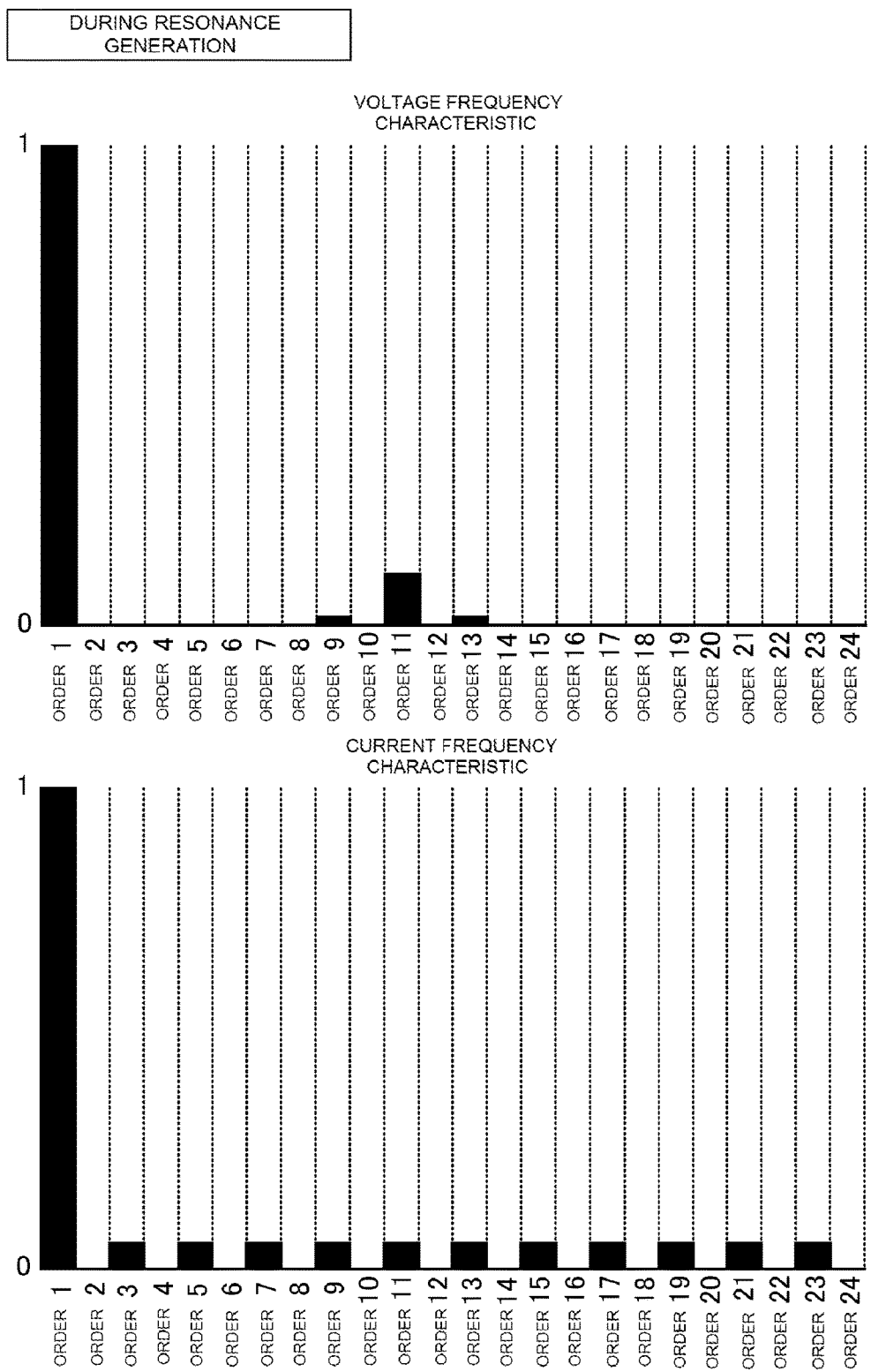
FIG. 19 is a schematic diagram illustrating an example of voltage frequency characteristic and current frequency characteristic during resonance generation.
Figure 20:
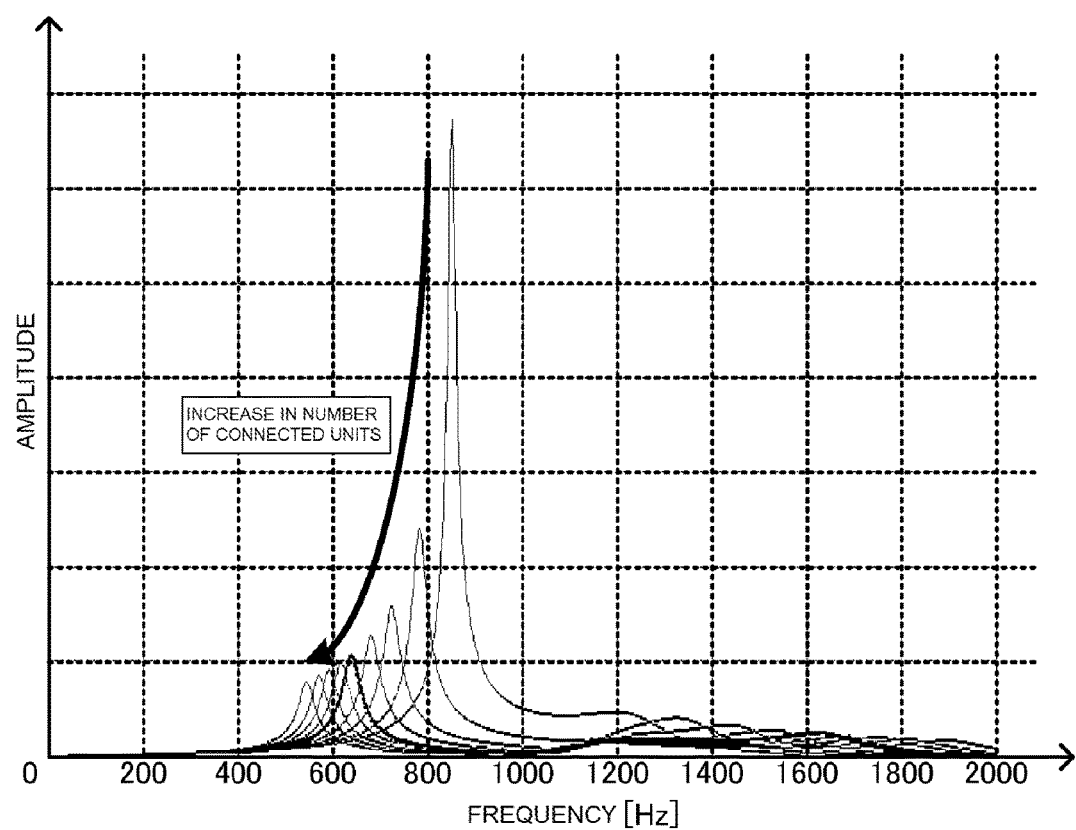
FIG. 20 illustrates the relationship between the number of the connected wind power generators and the resonance frequency.

Further, the resonance suppression device 1b extracts the direct current components of the d, q-axis currents ien(d, q) corresponding to the resonance frequency fn components of the output current ie(a, b, c) with the low-pass filters 12n and generates the current command values in(a, b, c)* on the basis thereof. Then, the compensating current i(a, b, c) following the current command values in(a, b, c)* is supplied to the power system 5. As a result, as depicted in FIG. 10, only the 11-th-order compensating current I11 is supplied in a period from t1 to t2, only the 13-th-order compensating current I13 is supplied in a period from t2 to t3, and only the 17-th-order compensating current I17 is supplied in a period from t3 to t4, and the power loss can be also eliminated in those periods. Further, for example, as depicted in FIGS. 11 and 12, only the 9-th-order, 11-th-order, and 13-th-order harmonic components at which the voltage resonance has been generated in FIG. 19 are suppressed. Therefore, the waveform of the connection point voltage v(a, b, c) is improved at a small compensating current i(a, b, c), and the resonance can be reliably suppressed even when the resonance point changes.

Third Embodiment

Configuration of Resonance Suppression Device

The configuration of the resonance suppression device according to the third embodiment of the present invention will be described hereinbelow with reference to FIGS. 13 and 14.

Figure 13:
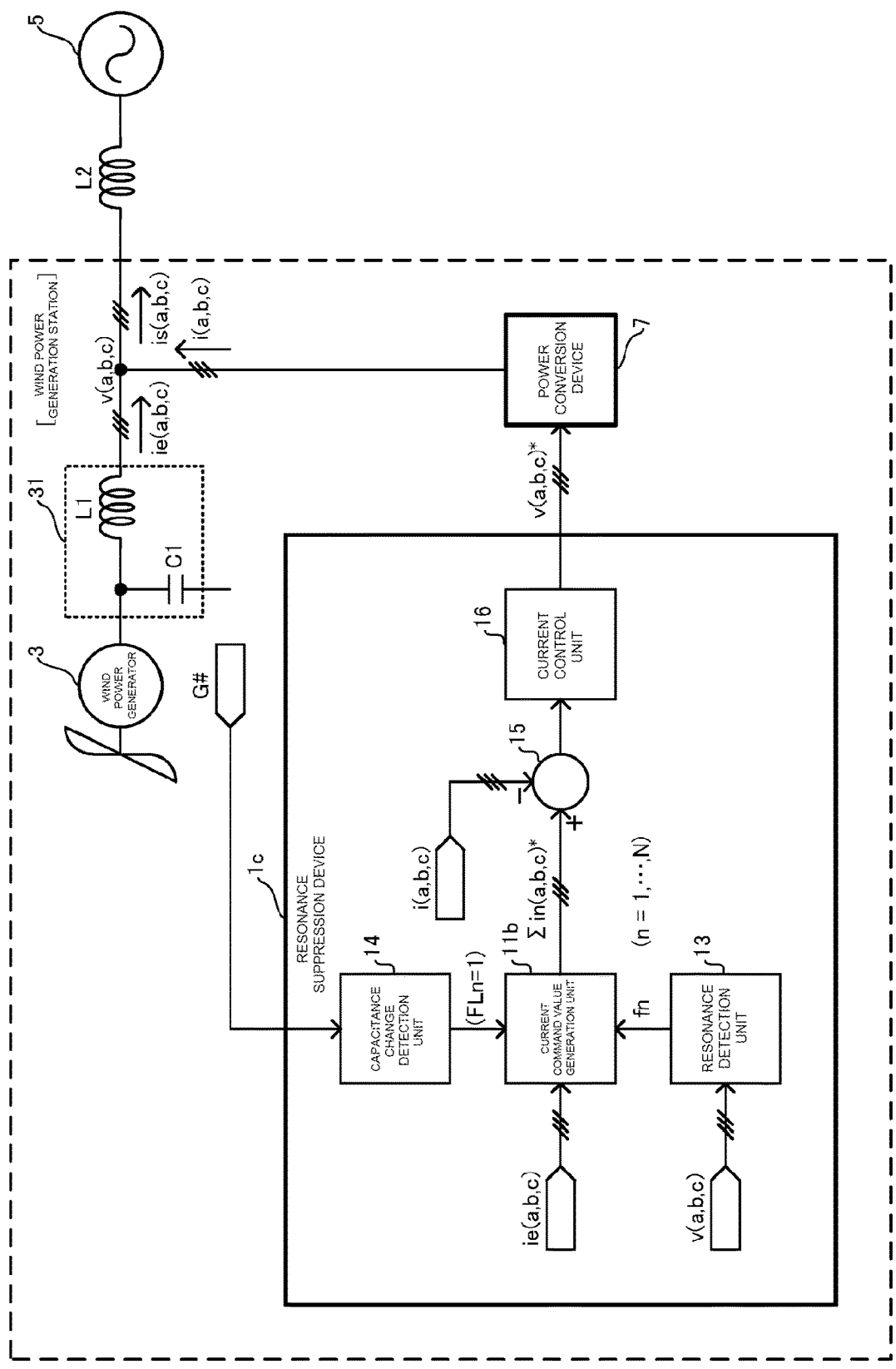
FIG. 13 is a block diagram illustrating the configuration of a resonance suppression device in the third embodiment of the present invention.
Figure 14:
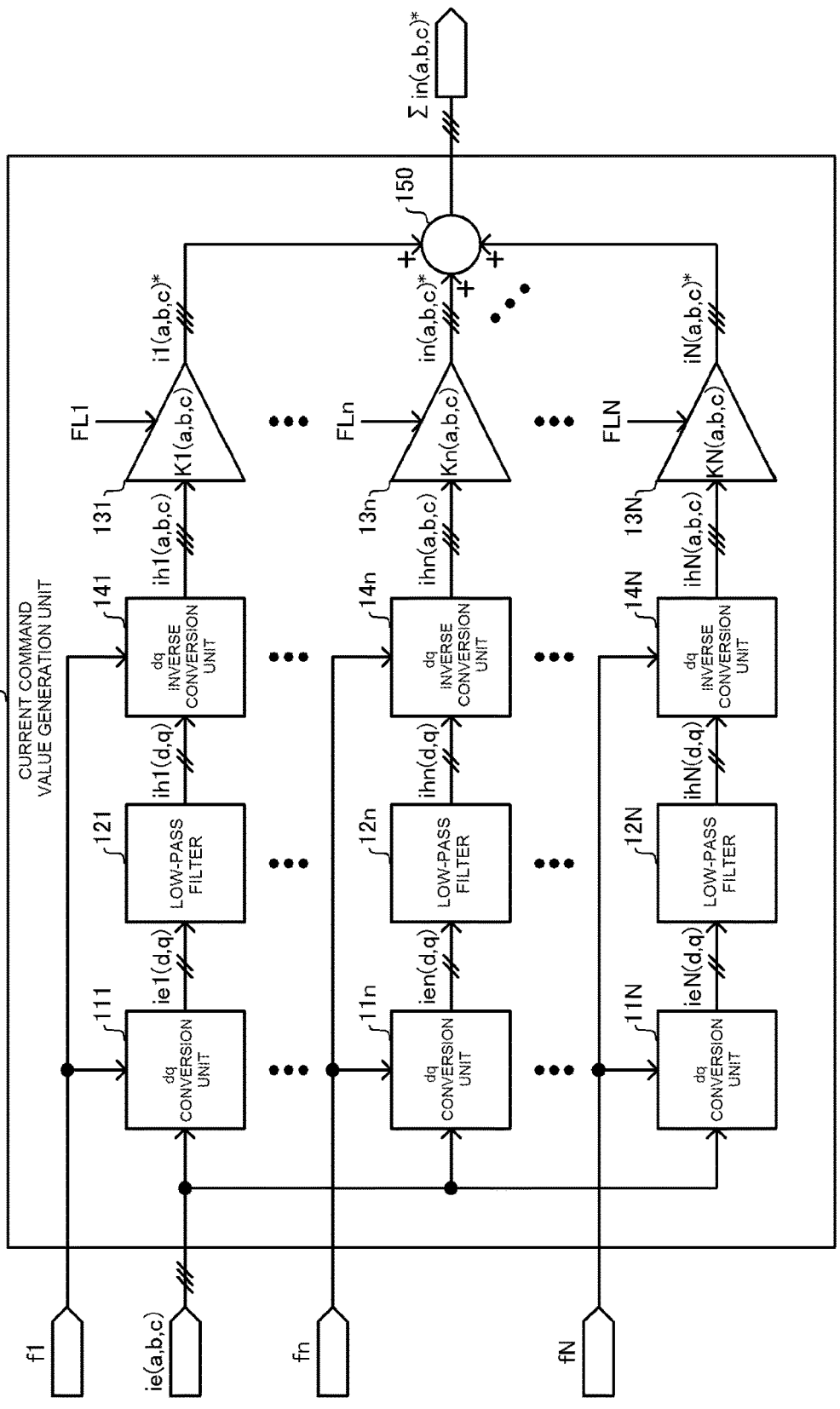
FIG. 14 is a block diagram illustrating a current command value generation unit in the third embodiment of the present invention.

A resonance suppression device 1c depicted in FIG. 13 is configured by a current command value generation unit 11b instead of the current command value generation unit 11a of the resonance suppression device 1b of the second embodiment. Further, the current command value generation unit 11b depicted in FIG. 14 is configured by N of each of dq conversion units 11n, low-pass filters 12n, gains 13n, and dq inverse conversion units 14n, and one addition unit 150, in the same manner as the current command value generation unit 11a of the second embodiment.

However, the current command value generation unit 11a of the second embodiment has one detection flag FL, whereas the current command value generation unit 11b of the present embodiment has N detection flags FLn correspondingly to the number of the resonance frequencies fn. Further, the gains Kn(a, b, c) are controlled according to the value (0 or 1) of the respective detection flags FLn. The detection flags FLn are set to "1" by the capacitance change detection unit 14.

The resonance suppression device 1c can be configured as a computer system. Functions of various units of the resonance suppression device 1c can be realized by executing a program in the processor of the computer system.

Operation of Resonance Suppression Device

Figure 15:
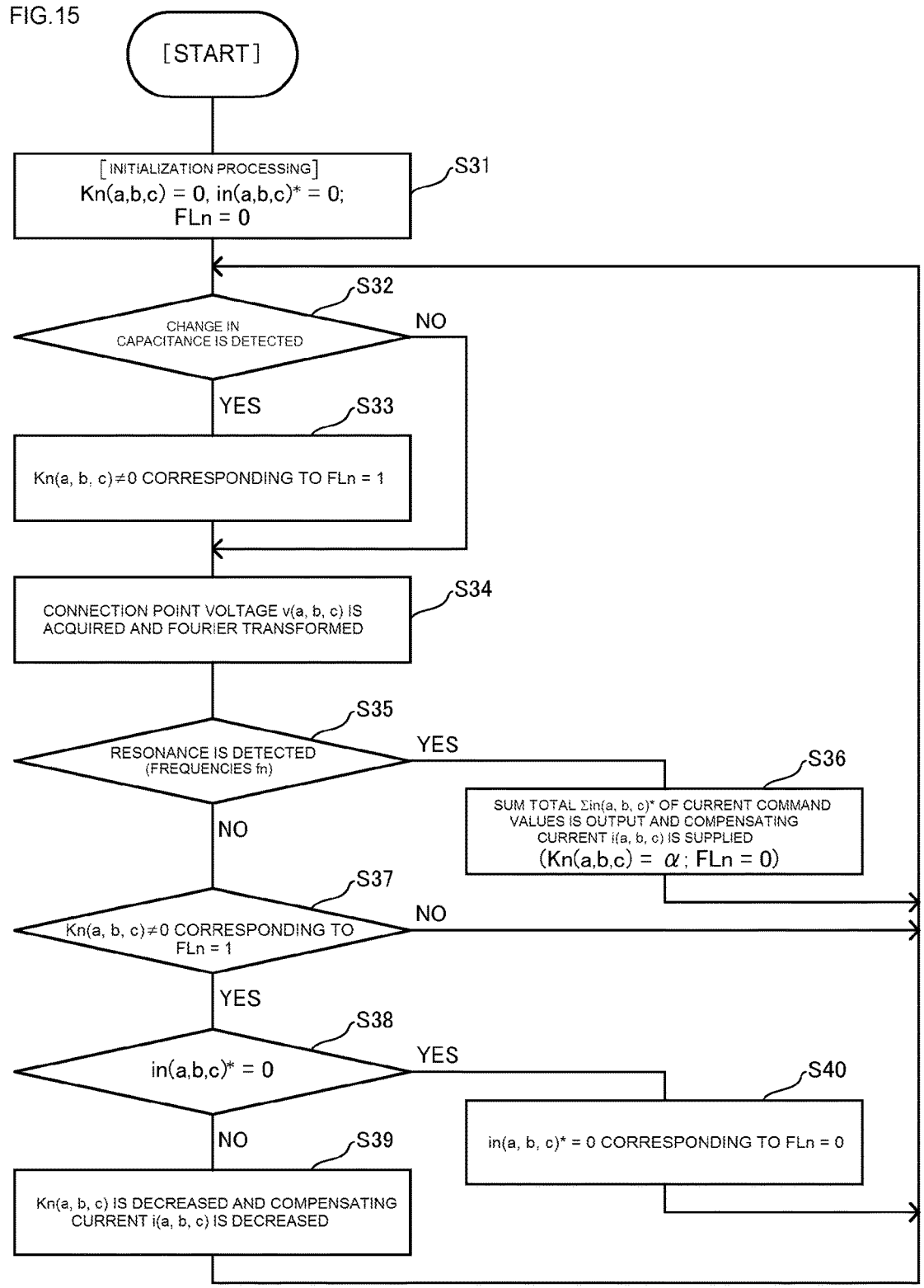
FIG. 15 is a flowchart illustrating the operation of the resonance suppression device in the third embodiment of the present invention.

The operation of the resonance suppression device of the present embodiment will be explained hereinbelow with reference to FIG. 15. FIG. 15 illustrated the processing performed with respect to "n" from "1" to "N" in the same manner as in FIG. 9.

The resonance suppression device 1c initially performs the initialization processing of the current command value generation unit 11b. In the initialization processing, the gains Kn(a, b, c) depicted in FIG. 14 are set to 0, and the current command values in(a, b, c)* are set to 0. As a result, the supply of the compensating current i(a, b, c) from the power conversion device 7 depicted in FIG. 13 to the power system 5 is stopped. The detection flags FLn of the current command value generation unit 11b are set to 0 (S31).

The capacitance change detection unit 14 depicted in FIG. 13 detects the change of the capacitance connected to the power system 5 and determines the presence/absence of the detection (S32). In the present embodiment, the capacitance change detection unit 14 acquires online the number G# of the wind power generators presently connected to the power system 5, detects the change of the combined capacitance C1 when the number G# changes (S32: YES), and sets the flags FLn corresponding to Kn(a, b, c)≠0, from among the detection flags FLn of the current command value generation unit 11b, to FLn=1 (S33). Meanwhile, where the capacitance change detection unit 14 does not detect the change of capacitance (S32: NO), the processing of S33 is not performed.

The resonance detection unit 13 depicted in FIG. 13 acquires the connection point voltage v(a, b, c) and performs the Fourier transform thereof, for example, by a FFT algorithm (S34). Then, the resonance detection unit 13 detects a voltage resonance from a peak of the obtained frequency spectrum, determines the presence/absence of the detection, and determines the resonance frequencies fn of the detected voltage resonance up to a maximum of N in the same manner as in the second embodiment (S35).

When the resonance detection unit 13 detects a voltage resonance at one or more resonance frequencies fn (S35: YES), the current command value generation unit 11b takes the gains Kn(a, b, c) corresponding to the detected resonance frequencies fn as α, generates the current command values in(a, b, c)*, and outputs the sum total Σin(a, b, c) thereof. As a result, the compensating current i(a, b, c) is supplied from the power conversion device 7 depicted in FIG. 13 to the power system 5. The detection flags FLn corresponding to the detected resonance frequencies fn are set to 0 (S36), and the processing returns to S32.

Meanwhile, where the resonance detection unit 13 does not detect the voltage resonance (S35: NO), the processing of S36 is not performed, and the processing advances to S37. Then, the resonance suppression device 1c repeats the processing from S32 to S37 until the capacitance change detection unit 14 detects the change of the combined capacitance C1, that is, while the detection flags are FLn=0 (S37: NO). Further, in S35, the resonance detection unit 13 can detect a voltage resonance at a new resonance frequency within a range in which the total number of N is not exceeded.

When the capacitance change detection unit 14 detects the change of the combined capacitance C1 and the detection flags corresponding to Kn(a, b, c)≠0, from among the detection flags FLn, become FLn=1 (S37: YES), the processing advances to S38. The current command value generation unit 11b then decreases the gains Kn(a, b, c) depicted in FIG. 14 and decreases the current command values in(a, b, c)* until the current command values in(a, b, c)* become 0 for all n (S38: NO). As a result, the components (referred to hereinbelow as compensating currents in(a, b, c)) of the compensating current i(a, b, c) supplied from the power conversion device 7 depicted in FIG. 13 to the power system 5, those components corresponding to the resonance frequencies fn, are decreased (S39). The gains Kn(a, b, c) may be decreased gradually at a constant rate or reduced to 0 at once.

Where a state is assumed in which the voltage resonance is not generated, even though the compensating currents in(a, b, c) are stopped, because the number G# of the connected wind power generators has changed, the resonance suppression device 1c repeats the processing in the order of S32: NO, S34, S35: NO, S37: YES, S38: NO, S39. Where the current command values in(a, b, c)* then become equal to 0 for all n (S38: YES), the detection flags FLn corresponding to in(a, b, c)*=0 are set to 0 (S40) and the processing returns to S32.

Where the voltage resonance is generated at the abovementioned or different resonance frequency due to the decrease in the compensating current i(a, b, c), and this voltage resonance is detected by the resonance detection unit 13 (S35: YES), the processing of S36 is performed. The current command value generation unit 11b then again takes the gains Kn(a, b, c) corresponding to the detected resonance frequencies fn as α, and outputs the sum total of current command values Σin(a, b, c)*. As a result, the compensating current in(a, b, c) is supplied from the power conversion device 7 depicted in FIG. 13 to the power system 5. Since the detection flags FLn corresponding to the detected resonance frequencies fn become 0, the resonance suppression device 1c repeats the processing from S32 to S37 until the detection flags again become FLn=1 (S37: NO).

Thus, the resonance suppression device 1c of the present embodiment starts the supply of the compensating currents in(a, b, c) from the power conversion device 7 to the power system 5 when the resonance detection unit 13 detects a voltage resonance. Where the capacitance change detection unit 14 detects the change of the combined capacitance C1, the compensating currents in(a, b, c) is decreased, and after it has been checked whether or not the voltage resonance is generated, the supply of the compensating currents in(a, b, c) is stopped or continued. As a result, the compensating currents in(a, b, c) that suppress the voltage resonance can be output only when the voltage resonance is generated, in the same manner as in the resonance suppression device 1a of the first embodiment or in the resonance suppression device 1b of the second embodiment, and the power loss or device capacitance caused by constant compensation of harmonic current can be eliminated.

Fourth Embodiment

Configuration and Operation of Resonance Suppression Device

The configuration and operation of the resonance suppression device according to the fourth embodiment of the present invention will be described hereinbelow with reference to FIG. 16.

In the first to third embodiments, the voltage command values are output from the resonance suppression device, the power conversion device 7 is controlled according to the voltage command value, and the compensating current i(a, b, c) is supplied to the power system 5. By contrast, in the present embodiment, the resonance is suppressed by outputting the current command value to the power conversion device 8 controlled according to the current command value.

Figure 16:
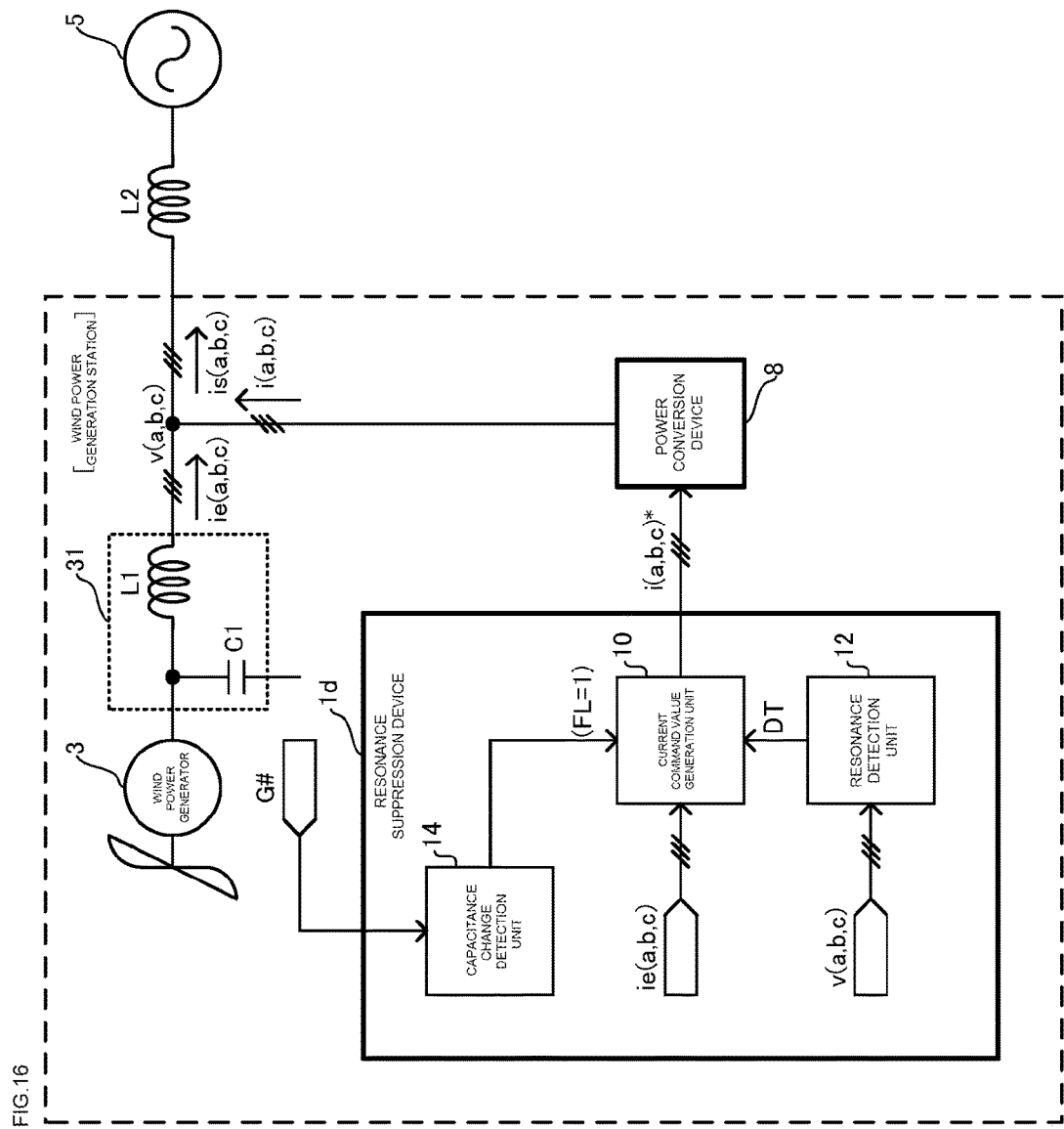
FIG. 16 is a block diagram illustrating the configuration of a resonance suppression device in the fourth embodiment of the present invention.

A resonance suppression device 1d depicted in FIG. 16 is configured to include the current command value generation unit 10, the resonance detection unit 12, and the capacitance change detection unit 14 of the first embodiment. The resonance suppression device 1d may be also configured to include the current command value generation unit 11a of the second embodiment or the current command value generation unit 11b of the third embodiment instead of the current command value generation unit 10, and the resonance detection unit 13 of the second and third embodiments instead of the resonance detection unit 12.

In the same manner as in the first embodiment, the current command value generation unit 10 generates the current command value i(a, b, c)* and outputs the generated current command value to the power conversion device 8 connected to the power system 5. As a result, the power conversion device 8 is controlled according to the current command value i(a, b, c)*, and the compensating current i(a, b, c) following the current command value i(a, b, c)* is supplied to the power system 5. In addition to an inverter and a UPFC, for example, a reactive power compensation device can be used as the power conversion device 8.

Fifth Embodiment

Configuration and Operation of Resonance Suppression Device

The configuration and operation of the resonance suppression device according to the fifth embodiment of the present invention will be described hereinbelow with reference to FIG. 17.

In the first to third embodiments, the compensating current i(a, b, c) following the current command value output from the current command value generation unit is output from the power conversion device 7 and supplied to the power system 5. By contrast, in the present embodiment, the resonance is suppressed by outputting the compensating current i(a, b, c) from the inverter provided in the resonance suppression device.

Figure 17:
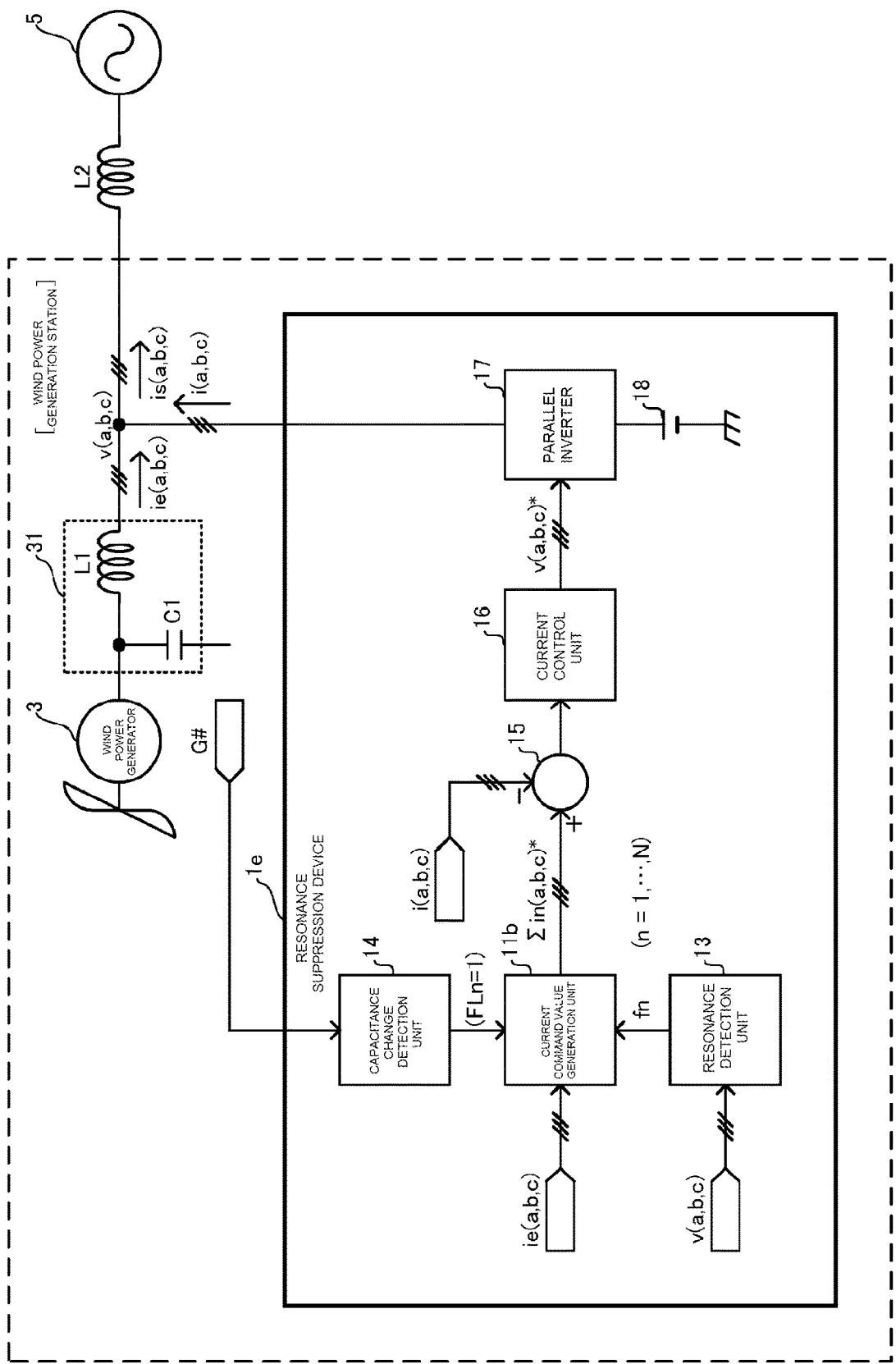
FIG. 17 is a block diagram illustrating the configuration of a resonance suppression device in the fifth embodiment of the present invention.
Figure 18:
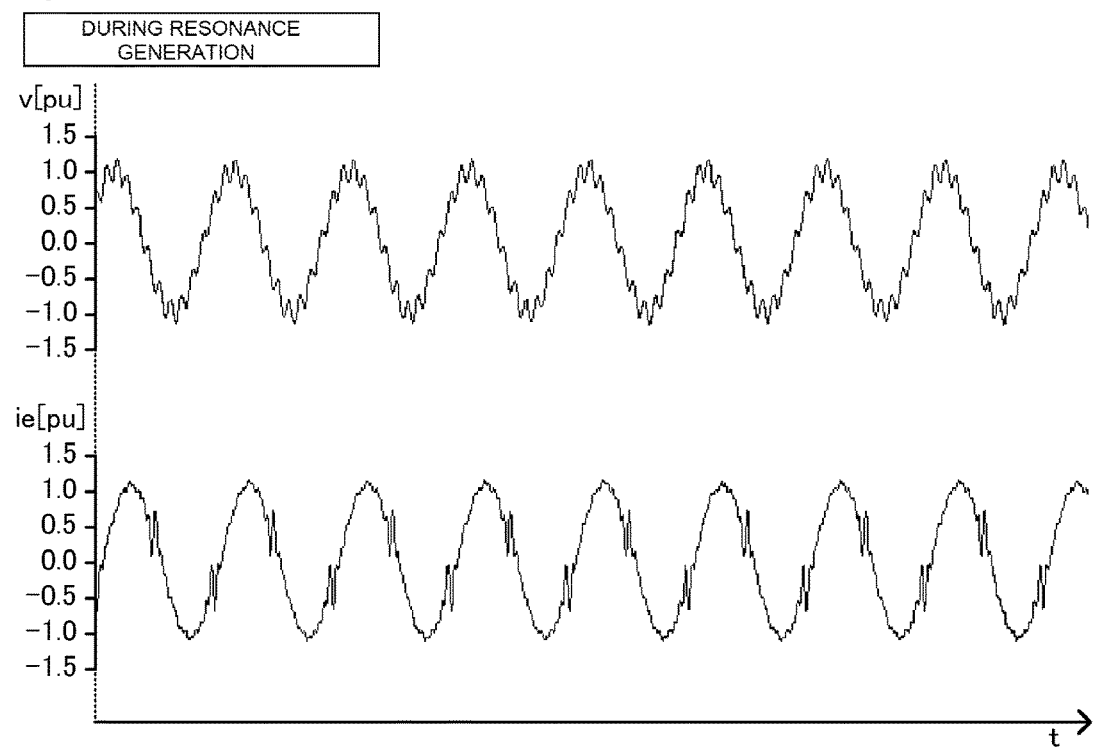
FIG. 18 is a schematic diagram illustrating an example of voltage v and current ie during resonance generation.

A resonance suppression device 1e depicted in FIG. 17 is configured to include a parallel inverter 17 and a direct current power supply 18 in addition to the components of the resonance suppression device 1c of the third embodiment. The resonance suppression device 1e may be also configured to include the parallel inverter 17 and the direct current power supply 18 in addition to the components of the resonance suppression device 1a of the first embodiment or the resonance suppression device 1b of the second embodiment.

The direct current power supply 18 is connected to the parallel inverter 17. Further, the voltage command value v(a, b, c)* output from the current control unit 16 is input to the parallel inverter 17. Further, the parallel inverter 17 is connected, via a transformer (not shown in the figures), in parallel with the power system 5, and the compensating current i(a, b, c) output from the parallel inverter 17 is supplied to the power system 5 in parallel with the output current ie(a, b, c) of the wind power generator 3. A parallel compensating unit provided in the UPFC can be used as such a parallel inverter 17.

The parallel inverter 17 performs the pulse width modulation (PWM) control or pulse amplitude modulation (PAM) control on the basis of the voltage command value v(a, b, c)*, converts the power of the direct current power supply 18 into alternating current power and outputs the compensating current i(a, b, c). As a result, the current control unit 16 controls the parallel inverter 17 such that the compensating current i(a, b, c) follows the current command value i(a, b, c)*, and the parallel inverter 17 supplies the compensating current i(a, b, c), which follows the current command value i(a, b, c)* to the power system 5.

As mentioned hereinabove, where the resonance detection unit 12 detects a voltage resonance in the resonance suppression device 1a, the supply of the compensating current i(a, b, c) is started from the power conversion device 7 to the power system 5, and where the capacitance change detection unit 14 detects a change in the capacitance connected to the power system 5, the compensating current i(a, b, c) is decreased, thereby making it possible to stop or continue the supply of the compensating current i(a, b, c) upon checking whether or not a voltage resonance has occurred. Thus, the compensating current i(a, b, c) suppressing the voltage resonance can be output only while the voltage resonance is generated. As a result, the power loss and apparatus capacitance caused by constant compensation of harmonic current can be reduced. Further, even when a resonance point changes, the resonance can be reliably suppressed.

A configuration may be also used in which the current command value is output to the power conversion device 8 controlled according to the current command value, and the compensating current i(a, b, c) is supplied from the power conversion device 8 to the power system 5, as in the resonance suppression device 1d. Further, a configuration may be also used in which the parallel inverter 17 is incorporated, and the compensating current i(a, b, c) is output from the parallel inverter 17 and supplied to the power system 5 in parallel with the wind power generator 3, as in the resonance suppression device 1e.

It is also possible to reduce the gain K(d, q) and decrease the compensating current i(a, b, c) by extracting the harmonic component of the output current ie(a, b, c) with the high-pass filter 120 and generate the current command value i(a, b, c)* by multiplying the extracted harmonic component by the gain K(d, q).

The harmonic component of the output current ie(a, b, c) can be extracted by performing the dq conversion of the output current ie(a, b, c) by using the system frequency f0 and then extracting the alternating current component of the d, q-axis current ie(d, q) with the high-pass filter 120.

Further, in the resonance suppression device 1b, the voltage resonance is detected, the resonance frequencies fn thereof are detected, the output current ie(a, b, c) is dq-converted using the resonance frequencies fn, and then the direct current components of the d, q-axis currents ien(d, q) are extracted by the low-pass filters 12n, thereby making it possible to extract the resonance frequency fn components of the output current ie(a, b, c). By generating the current command values in(a, b, c)* on the basis thereof, it is possible to suppress only the harmonic components that can generate the voltage resonance, improve the waveform of the connection point voltage v(a, b, c) with a small compensating current i(a, b, c), and reliably suppress the resonance even when the resonance point changes.

Further, a plurality of harmonic components which can cause the voltage resonance can be suppressed by providing N of each of the dq conversion units 11n, low-pass filters 12n, gains 13n, and dq inverse conversion units 14n and determining the resonance frequencies fn up to a maximum of N, whereby the resonance frequency fn components of the output current ie(a, b, c) are extracted up to a maximum of N and the current command values in(a, b, c)* are generated on the basis thereof.

Further, by acquiring online the number G# of the wind power generators presently connected to the power system 5, it is possible to detect the change in the combined capacitance C1 of the harmonic filters provided in the connected G# wind power generators when the number G# of the connected generators changes.

The above-described embodiments serve to facilitate the understanding aspects of the present invention and are not intended to restrict the present invention. The present invention can be changed and modified without departing from the essence thereof, and the present invention includes the equivalents thereof.

In the embodiments, the resonance generated by the connection of the harmonic filter 31 of the wind power generator 3 to the power system 5 is suppressed, but such a configuration is not limiting. The resonance suppression device of each embodiment can be also regarded as a (harmonic) current source which is to be connected to a power system in the same manner as a wind power generator, and can be used in other power facilities provided with a harmonic filter including a capacitance for removing a harmonic current. For example, the resonance suppression device can be used in other power generation facilities such as solar power generation, geothermal power generation, and wave power generation facilities. Further, the application is not limited to power generation facilities provided with a harmonic filter, and the resonance suppression device can be widely used when a power apparatus connected to a power system can become a resonance generation source.

Further, in the embodiments, the harmonic filter 31 is, for example, an alternating current filter (AC filter), but such a configuration is not limiting, and an inductance (for example, a reactor) or a capacitance (for example, a power capacitor or a cable) connected to the power system 5 may be also included.

In the embodiments, the change of the combined capacitance C1 of the harmonic filter connected to the power system 5 is detected on the basis of the number G# of the wind power generators presently connected to the power system 5. Such a configuration is selected because where the combined capacitance C1 changes due to a change in the number G# of the connected wind power generators, the resonance point changes and the supply of the compensating current can become unnecessary or the supply of the compensating current corresponding to another resonance frequency can become necessary. Further, where the change of the combined capacitance C1 is detected, the compensating current is decreased, and after it has been checked whether or not the voltage resonance is generated, it is determined to stop or continue the supply of the compensating current.

However, such a change in the resonance point (resonance frequency) can also occur when an impedance other than the combined capacitance C1 connected to the power system 5, for example, the combined inductance L1 of the transformer and the inductance L2 of the power system 5 which are shown in FIG. 1, is changed. Therefore, it is possible to detect the change of the impedance connected to the power system 5 over a wide range, without being restricted to changes in the number G# of the connected wind power generators, decrease the compensating current when such a change is detected, and determine whether to stop of continue the supply of the compensating current. The capacitance change detection unit 14 in the embodiments is an example of the impedance change detection unit that detects the change of such an impedance.

Reference signs and numerals are as follows:
1a to 1e resonance suppression devices
3 wind power generator
5 power system
7, 8 power conversion devices
10, 11a, 11b current command value generation units
12, 13 resonance detection units
14 capacitance change detection unit
15 addition unit
16 current control unit
17 parallel inverter
18 DC power supply
31 harmonic filter
110, 11n (111 to 11N) dq conversion units
120 high-pass filter
12n (121 to 12N) low-pass filters
130, 13n (131 to 13N)gains
140, 14n (141 to 14N)dq inverse conversion units
150 addition unit

What is claimed is:

1. A resonance suppression device that suppresses a resonance generated by connection of a power apparatus to a power system, the resonance suppression device comprising:
a current command value generator configured to output a current command value to a power conversion device connected to the power system based on an input of a current supplied from the power apparatus to the power system;
a resonance detector configured to detect the resonance based on harmonic components included in a voltage of the power system; and
an impedance change detector configured to detect a change of an impedance connected to the power system, wherein
when the resonance detector detects the resonance, the current command value generator generates the current command value based on harmonic components included in the current supplied from the power apparatus to the power system, and
when the impedance change detector detects a change of the impedance, the current command value generator generates the current command value so as to reduce a compensating current supplied from the power conversion device to the power system.

2. A resonance suppression device that suppresses a resonance generated by connection of a power apparatus to a power system, the resonance suppression device comprising:

a current command value generator configured to generate a current command value based on an input of a current supplied from the power apparatus to the power system;

a resonance detector configured to detect the resonance based on harmonic components included in a voltage of the power system;

an impedance change detector configured to detect a change of an impedance connected to the power system; and a current controller configured to control, based on the current command value, a compensating current to be supplied to the power system from a power conversion apparatus connected to the power system, wherein when the resonance detector detects the resonance, the current command value generator generates the current command value based on harmonic components included in the current supplied from the power apparatus to the power system, and when the impedance change detector detects a change of the impedance, the current command value generator generates the current command value so as to reduce the compensating current.

3. A resonance suppression device that suppresses a resonance generated by connection of a power apparatus to a power system, the resonance suppression device comprising:

an inverter configured to supply a compensating current in parallel with the power apparatus to the power system;

a current command value generator configured to generate a current command value based on an input of a current supplied from the power apparatus to the power system;

a resonance detector configured to detect the resonance based on harmonic components included in a voltage of the power system;

an impedance change detector configured to detect a change of an impedance connected to the power system; and a current controller configured to control, based on the current command value, a compensating current that is output from the inverter, wherein when the resonance detector detects the resonance, the current command value generator generates the current command value based on harmonic components included in the current supplied from the power apparatus to the power system, and when the impedance change detector detects a change of the impedance, the current command value generator generates the current command value so as to reduce the compensating current.

4. The resonance suppression device according to claim 1, wherein the current command value generator includes a high-pass filter that extracts a harmonic component included in a current supplied from the power apparatus to the power system and outputs the extracted harmonic component, and a gain corresponding to an output value of the high-pass filter, and the current command value generator outputs the current command value obtained by multiplying the output value of the high-pass filter by the gain when the resonance detector detects the resonance, and decreases the gain when the impedance change detector detects a change of the impedance.

5. The resonance suppression device according to claim 2, wherein the current command value generator includes a high-pass filter that extracts a harmonic component included in a current supplied from the power apparatus to the power system and outputs the extracted harmonic component, and a gain corresponding to an output value of the high-pass filter, and the current command value generator outputs the current command value obtained by multiplying the output value of the high-pass filter by the gain when the resonance detector detects the resonance, and decreases the gain when the impedance change detector detects a change of the impedance.

6. The resonance suppression device according to claim 3, wherein the current command value generator includes a high-pass filter that extracts a harmonic component included in a current supplied from the power apparatus to the power system and outputs the extracted harmonic component, and a gain corresponding to an output value of the high-pass filter, and the current command value generator outputs the current command value obtained by multiplying the output value of the high-pass filter by the gain when the resonance detector detects the resonance, and decreases the gain when the impedance change detector detects a change of the impedance.

7. The resonance suppression device according to claim 1, wherein the power system is a three-phase power system, and the current command value generator includes a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to a system frequency of the power system, a high-pass filter configured to extract alternating current components included in the d-axis current and the q-axis current and outputs the extracted components, a gain corresponding to an output value of the high-pass filter, and a dq inverse converter configured to perform dq inverse conversion of the d-axis component and q-axis component in the rotary coordinate system which are obtained by multiplying the output value of the high-pass filter by the gain and outputs the inversion conversion results, and the current command value generator outputs the current command value of each phase, which is obtained by the dq inverse conversion, when the resonance detector detects the resonance, and decreases the gain when the impedance change detector detects a change of the impedance.

8. The resonance suppression device according to claim 2, wherein
the power system is a three-phase power system, and
the current command value generator includes
a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to a system frequency of the power system,
a high-pass filter configured to extract alternating current components included in the d-axis current and the q-axis current and outputs the extracted components,
a gain corresponding to an output value of the high-pass filter, and
a dq inverse converter configured to perform dq inverse conversion of the d-axis component and q-axis component in the rotary coordinate system which are obtained by multiplying the output value of the high-pass filter by the gain and outputs the inversion conversion results, and
the current command value generator
outputs the current command value of each phase, which is obtained by the dq inverse conversion, when the resonance detector detects the resonance, and
decreases the gain when the impedance change detector detects a change of the impedance.

9. The resonance suppression device according to claim 3, wherein
the power system is a three-phase power system, and
the current command value generator includes
a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to a system frequency of the power system,
a high-pass filter configured to extract alternating current components included in the d-axis current and the q-axis current and outputs the extracted components,
a gain corresponding to an output value of the high-pass filter, and
a dq inverse converter configured to perform dq inverse conversion of the d-axis component and q-axis component in the rotary coordinate system which are obtained by multiplying the output value of the high-pass filter by the gain and outputs the inversion conversion results, and
the current command value generator
outputs the current command value of each phase, which is obtained by the dq inverse conversion, when the resonance detector detects the resonance, and
decreases the gain when the impedance change detector detects a change of the impedance.

10. The resonance suppression device according to claim 1, wherein
the power system is a three-phase power system,
the resonance detector detects the resonance and determines a resonance frequency; and
the current command value generator includes
a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to the resonance frequency;
a low-pass filter configured to extract direct current components included in the d-axis current and the q-axis current and outputs the extracted components,
a dq inverse converter that performs dq inverse conversion of the d-axis component and q-axis component in the rotary coordinate system of an output value of the low-pass filter and outputs the inversion conversion results, and
a gain corresponding to an output value of the dq inverse converter, and
the current command value generator
outputs the current command value of each phase which is obtained by multiplying the output value of the dq inverse converter by the gain when the resonance detector detects the resonance, and
decreases the gain when the impedance change detector detects a change of the impedance.

11. The resonance suppression device according to claim 2, wherein
the power system is a three-phase power system,
the resonance detector detects the resonance and determines a resonance frequency; and
the current command value generator includes
a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to the resonance frequency;
a low-pass filter configured to extract direct current components included in the d-axis current and the q-axis current and outputs the extracted components,
a dq inverse converter that performs dq inverse conversion of the d-axis component and q-axis component in the rotary coordinate system of an output value of the low-pass filter and outputs the inversion conversion results, and
a gain corresponding to an output value of the dq inverse converter, and
the current command value generator
outputs the current command value of each phase which is obtained by multiplying the output value of the dq inverse converter by the gain when the resonance detector detects the resonance, and
decreases the gain when the impedance change detector detects a change of the impedance.

12. The resonance suppression device according to claim 3, wherein
the power system is a three-phase power system,
the resonance detector detects the resonance and determines a resonance frequency; and
the current command value generator includes
a dq converter configured to perform dq conversion of a current of each phase supplied from the power apparatus to the power system and outputs a d-axis current, which is a d-axis component, and a q-axis current, which is a q-axis component, in a rotary coordinate system rotating at an angular frequency corresponding to the resonance frequency;

a low-pass filter configured to extract direct current components included in the d-axis current and the q-axis current and outputs the extracted components, a dq inverse converter that performs dq inverse conversion of the d-axis component and q-axis component in the rotary coordinate system of an output value of the low-pass filter and outputs the inversion conversion results, and a gain corresponding to an output value of the dq inverse converter, and the current command value generator outputs the current command value of each phase which is obtained by multiplying the output value of the dq inverse converter by the gain when the resonance detector detects the resonance, and decreases the gain when the impedance change detector detects a change of the impedance.

13. The resonance suppression device according to claim 10, wherein the current command value generator includes N (N is an integer equal to or greater than 2) of each of the dq converter, the low-pass filter, the dq inverse converter, and the gain;

the resonance detector determines the resonance frequencies up to a maximum of N; and the dq converter outputs the d-axis currents and the q-axis currents in the rotary coordinate system rotating at an angular frequency corresponding to the resonance frequency of the maximum N.

14. The resonance suppression device according to claim 11, wherein the current command value generator includes N (N is an integer equal to or greater than 2) of each of the dq converter, the low-pass filter, the dq inverse converter, and the gain;

the resonance detector determines the resonance frequencies up to a maximum of N; and the dq converter outputs the d-axis currents and the q-axis currents in the rotary coordinate system rotating at an angular frequency corresponding to the resonance frequency of the maximum N.

15. The resonance suppression device according to claim 12, wherein the current command value generator includes N (N is an integer equal to or greater than 2) of each of the dq converter, the low-pass filter, the dq inverse converter, and the gain;

the resonance detector determines the resonance frequencies up to a maximum of N; and the dq converter outputs the d-axis currents and the q-axis currents in the rotary coordinate system rotating at an angular frequency corresponding to the resonance frequency of the maximum N.

16. The resonance suppression device according to claim 1, wherein the impedance change detector detects the change of the impedance based on the number of power apparatuses connected to the power system.

17. The resonance suppression device according to claim 2, wherein the impedance change detector detects the change of the impedance based on the number of power apparatuses connected to the power system.

18. The resonance suppression device according to claim 3, wherein the impedance change detector detects the change of the impedance based on the number of power apparatuses connected to the power system.

* * * * *

UNITED STATES PATENT AND TRADEMARK OFFICE
CERTIFICATE OF CORRECTION

PATENT NO. : 9,590,485 B2
APPLICATION NO. : 14/850515
DATED : March 7, 2017
INVENTOR(S) : Toru Jintsugawa et al.

It is certified that error appears in the above-identified patent and that said Letters Patent is hereby corrected as shown below:

On the Title Page

Column 2 item (56), (Other Publications), Line 1:
Delete "maiied" and insert --mailed--, therefor Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*